United States Patent
Kim et al.

(10) Patent No.: US 12,112,751 B2
(45) Date of Patent: Oct. 8, 2024

(54) ELECTRONIC DEVICE FOR PROCESSING USER UTTERANCE AND METHOD FOR OPERATING SAME

(71) Applicant: Samsung Electronics Co., Ltd., Gyeonggi-do (KR)

(72) Inventors: Taegu Kim, Gyeonggi-do (KR); Hyeonjae Bak, Gyeonggi-do (KR); Yoonju Lee, Gyeonggi-do (KR); Hansin Koh, Gyeonggi-do (KR); Jooyeon Kim, Gyeonggi-do (KR); Gajin Song, Gyeonggi-do (KR); Jaeyung Yeo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 17/673,972

(22) Filed: Feb. 17, 2022

(65) Prior Publication Data
US 2022/0172722 A1    Jun. 2, 2022

Related U.S. Application Data

(63) Continuation of application No. PCT/KR2020/011672, filed on Sep. 1, 2020.

(30) Foreign Application Priority Data

Sep. 26, 2019 (KR) .................. 10-2019-0118581

(51) Int. Cl.
*G10L 15/22* (2006.01)
*G10L 15/06* (2013.01)
(Continued)

(52) U.S. Cl.
CPC ............ *G10L 15/22* (2013.01); *G10L 15/063* (2013.01); *G10L 15/1815* (2013.01);
(Continued)

(58) Field of Classification Search
CPC ... G10L 15/22; G10L 15/063; G10L 15/1815; G10L 15/30; G10L 2015/0635;
(Continued)

(56) References Cited

U.S. PATENT DOCUMENTS

| 2006/0052113 A1 | 3/2006 | Ophir et al. |
| 2006/0190974 A1* | 8/2006 | Lee ................. H04N 21/44218 348/E7.071 |

(Continued)

FOREIGN PATENT DOCUMENTS

| KR | 10-2012-0136417 A | 12/2012 |
| KR | 10-2014-0074229 A | 6/2014 |
| KR | 10-2016-0132748 A | 11/2016 |

*Primary Examiner* — Abul K Azad
(74) *Attorney, Agent, or Firm* — Cha & Reiter, LLC

(57) ABSTRACT

An electronic device, according to various embodiments, comprises a communication interface, a processor, and a memory. The memory may store instructions that, when executed, cause the processor to: obtain a user utterance; confirm context information associated with the user utterance; on the basis of the context information, select, as a target device, at least one external electronic device from among a plurality of external electronic devices; and via the communication interface, transmit at least a part of the context information to the at least one external electronic device selected as the target device. Various other embodiments are possible.

18 Claims, 11 Drawing Sheets

(51) Int. Cl.
  *G10L 15/18* (2013.01)
  *G10L 15/30* (2013.01)
(52) U.S. Cl.
  CPC ...... *G10L 15/30* (2013.01); *G10L 2015/0635* (2013.01); *G10L 2015/223* (2013.01); *G10L 2015/228* (2013.01)
(58) Field of Classification Search
  CPC ......... G10L 2015/223; G10L 2015/228; G10L 15/1822; G10L 15/04; G06F 3/167
  See application file for complete search history.

(56) References Cited

U.S. PATENT DOCUMENTS

| | | |
|---|---|---|
| 2007/0113249 A1 | 5/2007 | Kim et al. |
| 2012/0016678 A1 | 1/2012 | Gruber et al. |
| 2013/0275164 A1* | 10/2013 | Gruber .................... G10L 17/22 705/5 |
| 2014/0278413 A1* | 9/2014 | Pitschel ................. G10L 15/22 704/243 |
| 2015/0256873 A1* | 9/2015 | Klein ................ H04N 21/4383 725/39 |
| 2015/0310855 A1 | 10/2015 | Bak et al. |
| 2016/0098992 A1 | 4/2016 | Renard et al. |
| 2016/0170710 A1* | 6/2016 | Kim ........................ G06F 3/013 704/275 |
| 2016/0336024 A1* | 11/2016 | Choi ....................... G10L 15/22 |
| 2017/0092270 A1* | 3/2017 | Newendorp ....... H04N 21/4394 |
| 2018/0308486 A1 | 10/2018 | Saddler et al. |

\* cited by examiner

ELECTRONIC DEVICE FOR PROCESSING USER UTTERANCE AND METHOD FOR OPERATING SAME

CROSS-REFERENCE TO RELATED APPLICATION(S)

This application is a continuation of International Application No. PCT/KR2020/011672, filed on Sep. 1, 2020, which claims priority to Korean Patent Application No. 10-2019-0118581, filed on Sep. 26, 2019, in the Korean Intellectual Property Office, the disclosures of which are incorporated by reference herein in their entireties.

BACKGROUND

1. Field

Various embodiments relate to a method and a device for transmitting context information to an external electronic device and processing user utterance on the basis of context information obtained from the external electronic device.

2. Description of Related Art

Portable digital communication devices have become necessities for many modern people. Consumers want to enjoy a variety of high-quality services they want anytime and anywhere using portable digital communication devices.

Speech recognition services provide various content services to consumers in response to user voice received on the basis of speech recognition interfaces that are implemented in portable digital communication devices. In order to provide speech recognition services, technologies for recognizing and analyzing human languages (e.g., automatic speech recognition, natural language understanding, natural language generation, machine translation, dialogue systems, question answering, speech recognition/synthesis, and the like) are implemented in the portable digital communication devices.

In order to provide high-quality speech recognition services to consumers, it is necessary to implement a technology for accurately identifying user intent from the user voice and a technology for providing an appropriate content service corresponding to the identified user intent.

SUMMARY

In the case where a user utterance is processed by an external electronic device and another user utterance subsequent thereto is received through an electronic device, the electronic device obtains context information related to the user utterance processed by the external electronic device from a server and processes the subsequent user utterance using the context information obtained from the server. In order to realize this, the server must search for and analyze context information related to the user utterances processed by each of a plurality of electronic devices in real time, and must transmit the same to another electronic device, which requires a high-performance server.

According to various embodiments, an electronic device may include: a communication interface; a processor; and a memory, wherein the memory may store instructions configured to cause, when executed, the processor to acquire a user utterance, identify context information related to the user utterance, select, as a target device, at least one external electronic device from among a plurality of external electronic devices on the basis of the context information, and transmit at least some of the context information to the at least one external electronic device selected as the target device through the communication interface.

According to various embodiments, an electronic device may include: a communication interface; a processor; and a memory, wherein the memory may store instructions configured to cause, when executed, the processor to acquire a user utterance, establish a short-range wireless communication connection with an external electronic device for performing a task corresponding to the user utterance through the communication interface, acquire first context information from the external electronic device through the communication interface, identify whether or not it is necessary to update second context information regarding the state of the electronic device on the basis of the first context information, and, based on identifying that it is necessary to update the second context information, update the second context information using the first context information.

According to various embodiments, a method of processing a user utterance may include: acquiring a user utterance; identifying context information related to the user utterance; selecting, as a target device, at least one external electronic device from among a plurality of external electronic devices on the basis of the context information; and transmitting at least some of the context information to the at least one external electronic device selected as the target device through the communication interface.

According to various embodiments, each of an electronic device and a plurality of external electronic devices is able to be provided as an on-device type device capable of obtaining a user utterance and performing a task corresponding to the user utterance. According to various embodiments, an electronic device is able to select an external electronic device on the basis of context information and to transmit some of the context information, and the electronic device is able to process a user utterance using context information obtained from the external electronic device.

DETAILED DESCRIPTION

According to various embodiments, the electronic device may select an external electronic device to which context information is transmitted from among a plurality of external electronic devices on the basis of context information related to user utterances, and may provide the external electronic device with the context information is in a suitable form. In addition, according to various embodiments, the electronic device may obtain context information related to the user utterance directly from an external electronic device, and may perform a task corresponding to the user utterance using the obtained context information.

Figure 1:
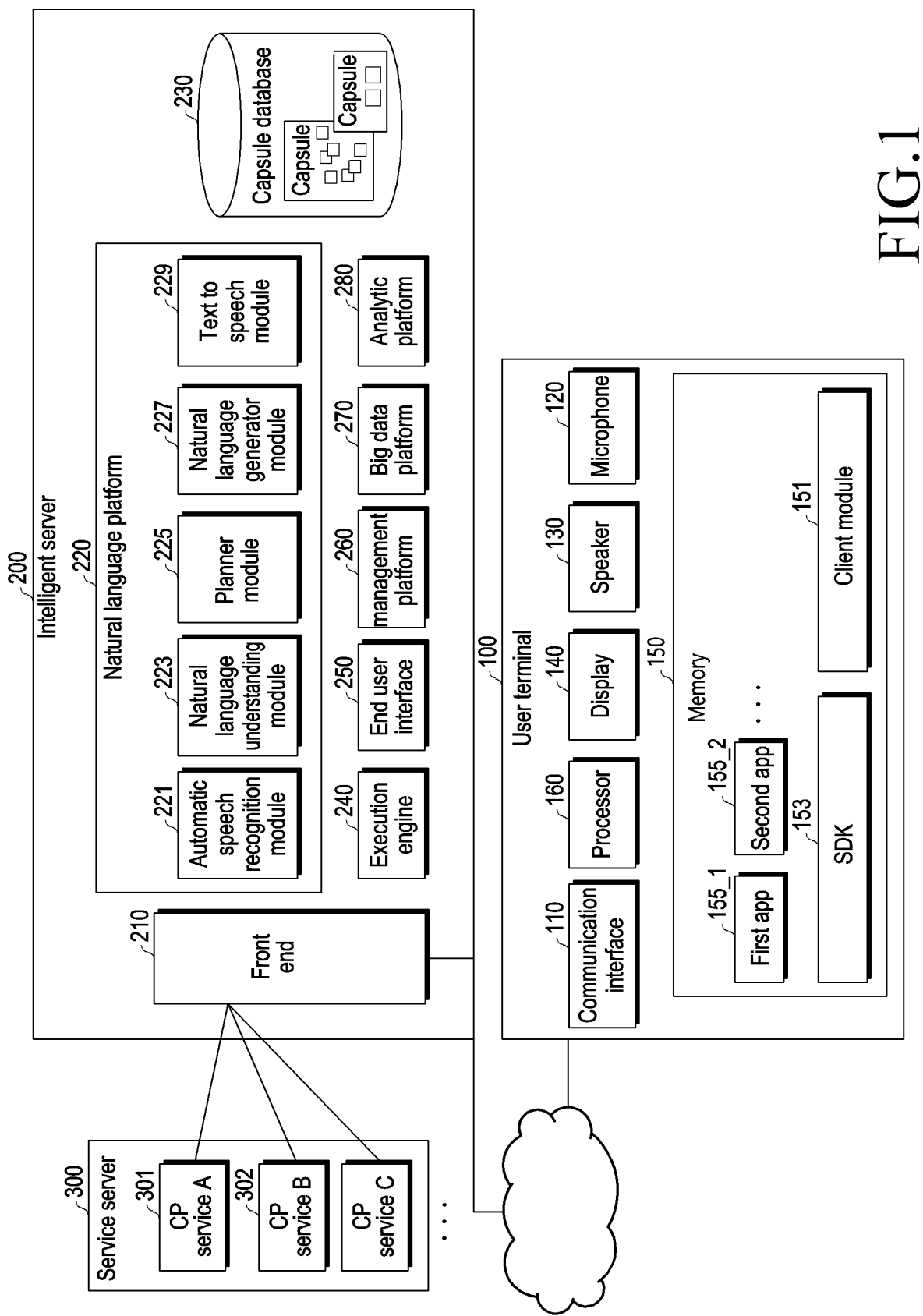
FIG. 1 is a block diagram illustrating an integrated intelligence system according to various embodiments.

FIG. 1 is a block diagram illustrating an integrated intelligence system according to various embodiments.

Referring to FIG. 1, the integrated intelligence system according to an embodiment may include a user terminal 100, an intelligent server 200, and a service server 300.

The user terminal 100 according to an embodiment may be a terminal device (or an electronic device) connectable to the Internet, such as mobile phones, smart phones, personal digital assistants (PDAs), notebook computers, TV sets, home appliances, wearable devices, HMDs, or smart speakers.

According to the illustrated embodiment, the user terminal 100 may include a communication interface 110, a microphone 120, a speaker 130, a display 140, a memory 150, or a processor 160. The elements listed above may be operatively or electrically connected to each other.

The communication interface 110 in an embodiment may be configured to transmit and receive data while being connected to an external device. The microphone 120 in an embodiment may receive sound (e.g., a user utterance) and, may convert the same into an electrical signal. The speaker 130 in an embodiment may output an electrical signal in the form of sound (e.g., voice). The display 140 in an embodiment may be configured to display images or videos. The display 140 in an embodiment may display graphic user interfaces (GUIs) of executed apps (or application program).

The memory 150 in an embodiment may store a client module 151, a software development kit (SDK) 153, and a plurality of apps 155. The client module 151 and the SDK 153 may configure a framework (or a solution program) for performing general functions. In addition, the client module 151 or the SDK 153 may configure a framework for processing a voice input.

In the memory 150 of an embodiment, the plurality of apps 155 may be programs for performing specified functions. According to an embodiment, the plurality of apps 155 may include a first app 155_1 and a second app 155_3. According to an embodiment, each of the plurality of apps 155 may include a plurality of operations for performing a specified function. For example, the apps may include an alarm app, a message app, and/or a schedule app. According to an embodiment, the plurality of apps 155 may be executed by the processor 160, thereby sequentially executing at least some of the plurality of operations.

The processor 160 in an embodiment may control the overall operation of the user terminal 100. For example, the processor 160 may be electrically connected to the communication interface 110, the microphone 120, the speaker 130, and the display 140, and may perform specified operations.

The processor 160 in an embodiment may also execute a program stored in the memory 150 to perform a specified function. For example, the processor 160 may execute at least one of the client module 151 or the SDK 153, thereby performing the following operation for processing a voice input. The processor 160, for example, may control the operation of the plurality of apps 155 through the SDK 153. The following operation described as the operation of the client module 151 or the SDK 153 may be the operation executed by the processor 160.

The client module 151 in an embodiment may receive a voice input. For example, the client module 151 may receive a voice signal corresponding to a user utterance detected through the microphone 120. The client module 151 may transmit the received voice input to the intelligent server 200. The client module 151 may transmit state information of the user terminal 100 to the intelligent server 200 along with the received voice input. The state information, for example, may be information on the execution state of the app.

The client module 151 in an embodiment may receive a result corresponding to the received voice input. For example, if the intelligent server 200 is able to produce a result corresponding to the received voice input, the client module 151 may receive the result corresponding to the received voice input. The client module 151 may display the received result on the display 140.

The client module 151 in an embodiment may receive a plan corresponding to the received voice input. The client module 151 may display execution results of a plurality of operations of the app according to the plan on the display 140. The client module 151, for example, may sequentially display the execution results of a plurality of operations on the display. As another example, the user terminal 100 may display only some of the execution results of the plurality of operations (e.g., the result of the last operation) on the display.

According to an embodiment, the client module 151 may receive, from the intelligent server 200, a request for obtaining information required to produce the result corresponding to the voice input. According to an embodiment, the client module 151 may transmit the required information to the intelligent server 200 in response to the request.

The client module 151 in an embodiment may transmit information on the results of executing a plurality of operations according to the plan to the intelligent server 200. The intelligent server 200 may identify that the received voice input has been correctly processed through the result information.

The client module 151 in an embodiment may include a speech recognition module. According to an embodiment, the client module 151 may recognize a voice input performing a limited function through the speech recognition module. For example, the client module 151 may execute an intelligent app for processing a voice input for executing collaborative operations through a specified input (e.g., "Wake up!").

The intelligent server 200 in an embodiment may receive information related to a user voice input from the user terminal 100 through a communication network. According to an embodiment, the intelligent server 200 may convert data related to the received voice input into text data. According to an embodiment, the intelligent server 200 may produce a plan for performing a task corresponding to the user voice input on the basis of the text data.

According to an embodiment, the plan may be produced by an artificial intelligent (AI) system. The artificial intelligent system may be a rule-based system, or may be a neural network-based system (e.g., a feedforward neural network (FNN) or a recurrent neural network (RNN)). Alternatively, the artificial intelligent system may be a combination of the above systems, or may be another artificial intelligent system. According to an embodiment, the plan may be selected from a set of predefined plans, or may be produced in real time in response to a request by the user. For example, the artificial intelligent system may select at least one plan from among a plurality of predefined plans.

The intelligent server 200 in an embodiment may transmit a result according to the produced plan to the user terminal 100, or may transmit the produced plan to the user terminal 100. According to an embodiment, the user terminal 100 may display the result according to the plan on the display. According to an embodiment, the user terminal 100 may display the result of executing the operation according to the plan on the display.

The intelligent server 200 in an embodiment may include a front end 210, a natural language platform 220, a capsule database (DB) 230, an execution engine 240, an end user interface 250, a management platform 260, a big data platform 270, or an analytic platform 280.

The front end 210 in an embodiment may receive a voice input received from the user terminal 100. The front end 210 may transmit a response corresponding to the voice input.

According to an embodiment, the natural language platform 220 may include an automatic speech recognition module (ASR module) 221, a natural language understanding module (NLU module) 223, a planner module 225, a natural language generator module (NLG module) 227, or a text-to-speech module (TTS module) 229.

The automatic speech recognition module 221 in an embodiment may convert a voice input received from the user terminal 100 into text data. The natural language understanding module 223 in an embodiment may recognize the intent of the user using the text data of the voice input. For example, the natural language understanding module 223 may perform a syntactic analysis or a semantic analysis, thereby recognizing the intent of the user. The natural language understanding module 223 in an embodiment may recognize the meaning of a word extracted from the voice input using the linguistic features (e.g., syntactic elements) of morphemes or phrases, and may match the recognized meaning of the word with the intent, thereby determining the intent of the user.

The planner module 225 in an embodiment may produce a plan using the intent determined in the natural language understanding module 223 and parameters. According to an embodiment, the planner module 225 may determine a plurality of domains required to perform a task on the basis of the determined intent. The planner module 225 may determine a plurality of operations included in each of the plurality of domains determined on the basis of the intent. According to an embodiment, the planner module 225 may determine parameters required to execute the plurality of determined operations or result values output by executing the plurality of operations. The parameters and the result values may be defined as concepts of a designated format (or class). Accordingly, the plan may include a plurality of operations determined on the basis of the intent of the user, and a plurality of concepts. The planner module 225 may determine the relationship between the plurality of operations and the plurality of concepts by stages (or hierarchically). For example, the planner module 225 may determine the order of executing a plurality of operations determined based on the intent of the user on the basis of the plurality of concepts. In other words, the planner module 225 may determine the order of executing a plurality of operations on the basis of the parameters necessary for execution of the plurality of operations and the results output by the execution of the plurality of operations. Accordingly, the planner module 225 may produce a plan including relationship information (e.g., ontology) between a plurality of operations and a plurality of concepts. The planner module 225 may produce a plan using information stored in the capsule database 230 that stores a set of relationships between concepts and operations.

The natural language generator module 227 in an embodiment may convert specified information into text. The information converted into the text may be in the form of natural language speech. The text-to-speech module 229 in an embodiment may convert information in the form of text into information in the form of a voice.

According to an embodiment, some or all of the functions of the natural language platform 220 may be implemented in the user terminal 100 as well.

The capsule database 230 may store information on the relationship between a plurality of concepts and actions corresponding to a plurality of domains. The capsule according to an embodiment may include a plurality of action objects (or action information) and concept objects (concept information) included in the plan. According to an embodiment, the capsule database 230 may store a plurality of capsules in the form of a concept action network (CAN). According to an embodiment, a plurality of capsules may be stored in a function registry included in the capsule database 230.

The capsule database 230 may include a strategy registry that stores strategy information necessary for determining the plan corresponding to the voice input. If there is a plurality of plans corresponding to the voice input, the strategy information may include reference information for determining one plan. According to an embodiment, the capsule database 230 may include a follow-up registry that stores information for a subsequent operation in order to propose the subsequent operation to the user in a specified situation. The subsequent operation may include, for example, a subsequent utterance. According to an embodiment, the capsule database 230 may include a layout registry that stores information on the layout of information output through the user terminal 100. According to an embodiment, the capsule database 230 may include a vocabulary registry that stores vocabulary information included in the capsule information. According to an embodiment, the capsule database 230 may include a dialog registry that stores information on the dialogs (or interactions) with the user. The capsule database 230 may update the stored object through a developer tool. The developer tool may include, for example, a function editor for updating the action object or the concept object. The developer tool may include a vocabulary editor for updating vocabulary. The developer tool may include a strategy editor for producing and registering a strategy for determining the plan. The developer tool may include a dialog editor for producing a dialog with the user. The developer tool may include a follow-up editor capable of activating a subsequent goal and editing a subsequent utterance that provide hints. The subsequent goal may be determined on the basis of the currently set goal, user preferences, or environmental conditions. In an embodiment, the capsule database 230 may also be implemented in the user terminal 100.

The execution engine 240 in an embodiment may produce a result using the produced plan. The end user interface 250 may transmit the produced result to the user terminal 100. Accordingly, the user terminal 100 may receive the result, and may provide the received result to the user. The management platform 260 in an embodiment may manage information used in the intelligent server 200. The big data platform 270 in an embodiment may collect user data. The analytic platform 280 in an embodiment may manage the quality of service (QoS) of the intelligent server 200. For example, the analytic platform 280 may manage the elements and the processing speed (or efficiency) of the intelligent server 200.

The service server 300 in an embodiment may provide a specified service (e.g., order food or reserve hotel) to the user terminal 100. According to an embodiment, the service server 300 may be a server operated by a third party. The service server 300 in an embodiment may provide the intelligent server 200 with information for producing the plan corresponding to the received voice input. The provided information may be stored in the capsule database 230. In addition, the service server 300 may provide information on a result according to the plan to the intelligent server 200.

In the integrated intelligence system described above, the user terminal 100 may provide various intelligent services to the user in response to a user input. The user input, for example, may include an input through a physical button, a touch input, or a voice input.

In an embodiment, the user terminal 100 may provide speech recognition services through an intelligent app (or a speech recognition app) stored therein. In this case, for example, the user terminal 100 may recognize a user utterance or a voice input received through the microphone, and may provide a service corresponding to the recognized voice input to the user.

In an embodiment, the user terminal 100 may perform a specified operation alone or together with the intelligent server 200 and/or the service server on the basis of the received voice input. For example, the user terminal 100 may execute an app corresponding to the received voice input, and may perform a specified operation through the executed app.

In an embodiment, in the case in which the user terminal 100 provides a service together with the intelligent server 200 and/or the service server, the user terminal may detect a user utterance using the microphone 120, and may generate a signal (or voice data) corresponding to the detected user utterance. The user terminal may transmit the voice data to the intelligent server 200 using the communication interface 110.

In response to the voice input received from the user terminal 100, the intelligent server 200 according to an embodiment may produce a plan for performing the task corresponding to the voice input, or results of performing the operation according to the plan. The plan may include, for example, a plurality of operations for performing the task corresponding to the user voice input and a plurality of concepts related to the plurality of operations. The concepts may be defined as parameters that are input for execution of the plurality of operations or result values that are output by execution of the plurality of operations. The plan may include information on the relationship between the plurality of operations and the plurality of concepts.

The user terminal 100 according to an embodiment may receive the response using the communication interface 110. The user terminal 100 may output a voice signal generated inside the user terminal 100 to the outside using the speaker 130, or may output an image produced inside the user terminal 100 to the outside using the display 140.

Figure 2:
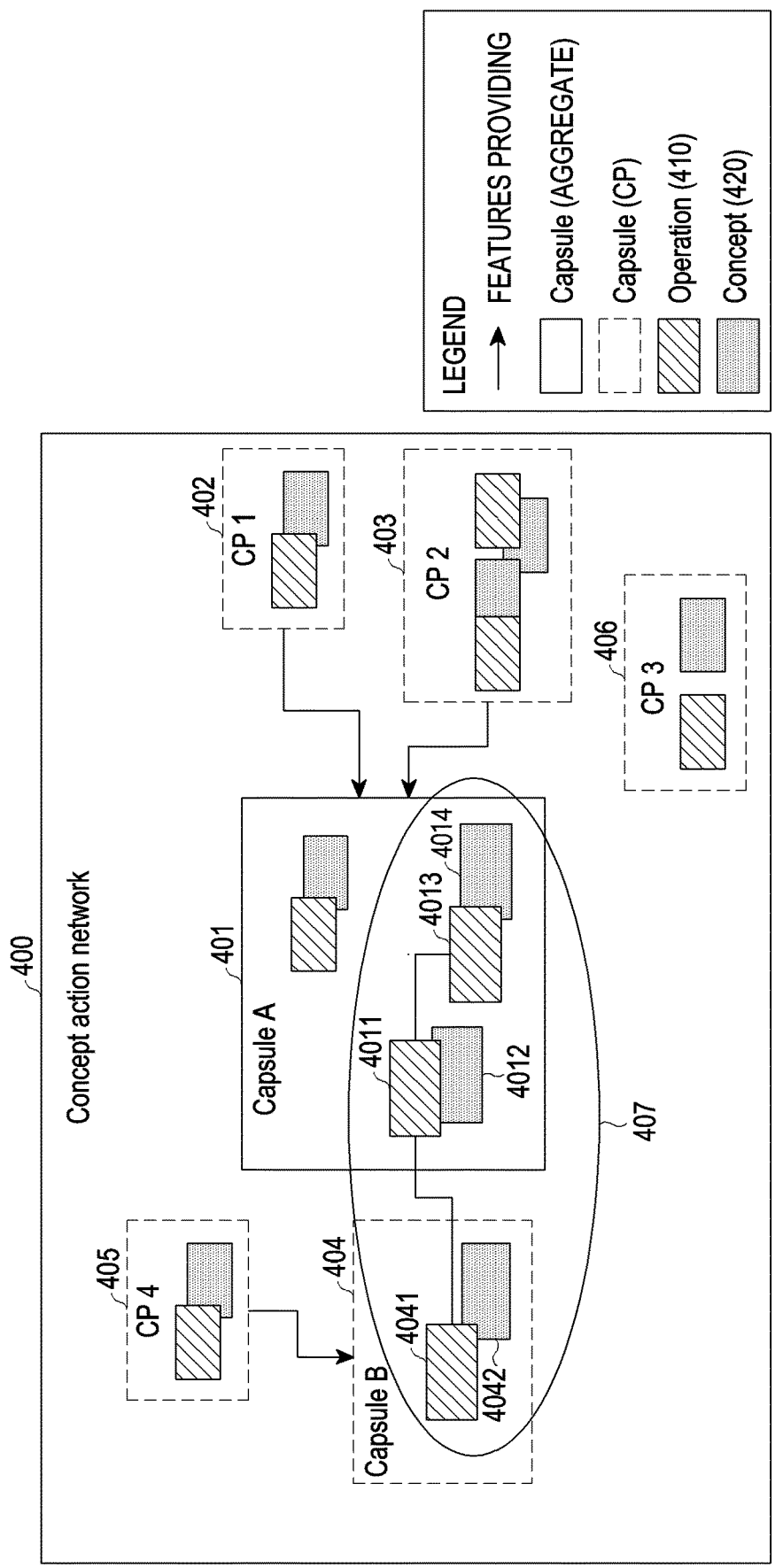
FIG. 2 is a diagram illustrating the state in which relationship information between concepts and actions is stored in a database according to various embodiments.

FIG. 2 is a diagram illustrating the state in which relationship information between concepts and actions is stored in a database according to various embodiments.

A capsule database (e.g., the capsule database 230) of the intelligent server 200 may store capsules in the form of a concept action network (CAN) 400. The capsule database may store operations for processing the tasks corresponding to the user voice inputs and parameters required for the operations in the form of a concept action network (CAN) 400.

The capsule database may store a plurality of capsules (capsule A 401 and capsule B 404) corresponding to respective domains (e.g., applications). According to an embodiment, one capsule (e.g., capsule A 401) may correspond to one domain (e.g., a geographic location or an application). In addition, one capsule may correspond to at least one service provider (e.g., CP 1 402, CP 2 403, CP 3 406, or CP 4 405) for executing a function for the domain related to the capsule. According to an embodiment, one capsule may include one or more operations 410 and one or more concepts 420 in order to execute a specified function.

The natural language platform 220 may produce a plan for performing a task corresponding to the received voice input using the capsules stored in the capsule database. For example, the planner module 225 of the natural language platform may produce a plan using the capsules stored in the capsule database. For example, a plan 407 may be produced using operations 4011 and 4013 and concepts 4012 and 4014 of capsule A 401, and an operation 4041 and a concept 4042 of capsule B 404.

Figure 3:
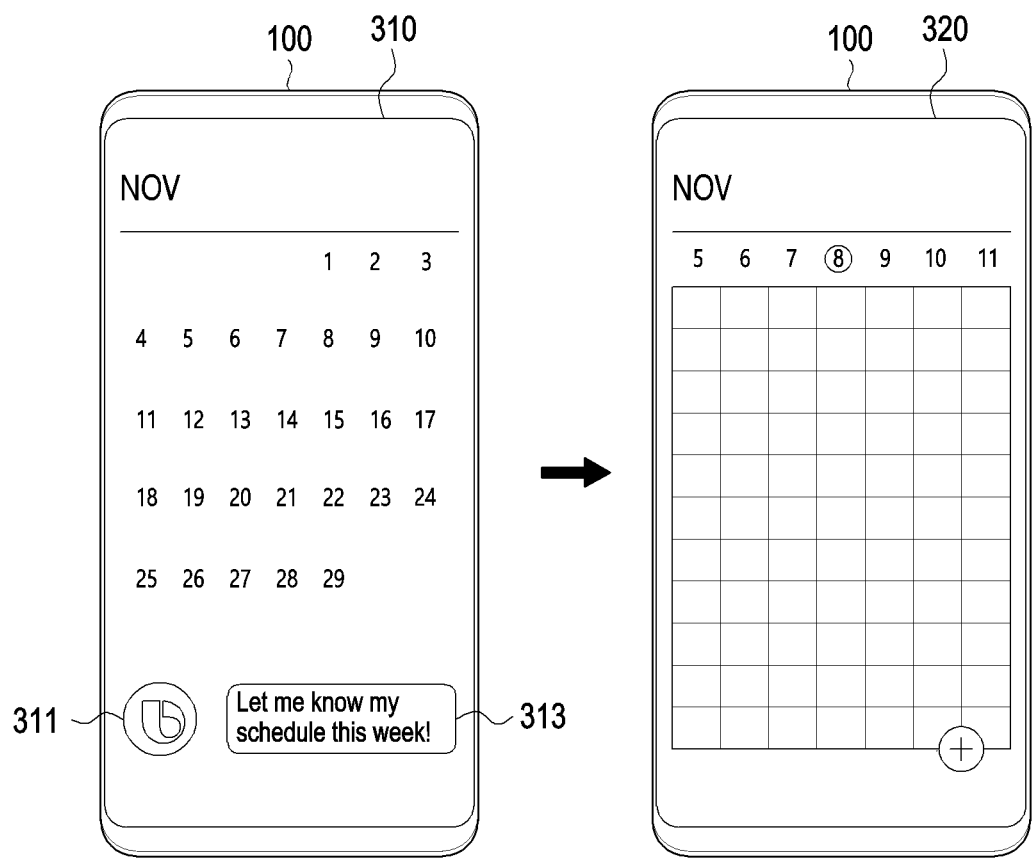
FIG. 3 is a diagram illustrating a user terminal displaying a screen for processing a voice input received through an intelligent app according to various embodiments.

FIG. 3 is a diagram illustrating a user terminal displaying a screen for processing a voice input received through an intelligent app according to various embodiments.

The user terminal 100 may execute an intelligent app in order to process a user input through the intelligent server 200.

According to an embodiment, in a screen 310, when the user terminal 100 recognizes a specified voice input (e.g., "Wake up") or receives an input through a hardware key (e.g., a dedicated hardware key), the user terminal may execute an intelligent app for processing the voice input. The user terminal 100 may execute the intelligent app while, for example, a schedule app is running. According to an embodiment, the user terminal 100 may display an object (e.g., an icon) 311 corresponding to the intelligent app on the display 140. According to an embodiment, the user terminal 100 may receive a voice input by a user utterance. For example, the user terminal 100 may receive a voice input saying "Tell me about the schedule of this week!". According to an embodiment, the user terminal 100 may display, on the display, a user interface (UI) 313 (e.g., an input window) of the intelligent app in which text data of the received voice input is shown.

According to an embodiment, in a screen 320, the user terminal 100 may display a result corresponding to the received voice input on the display. For example, the user terminal 100 may receive a plan corresponding to the received user input, and may display "the schedule of this week" on the display according to the plan.

Figure 4:
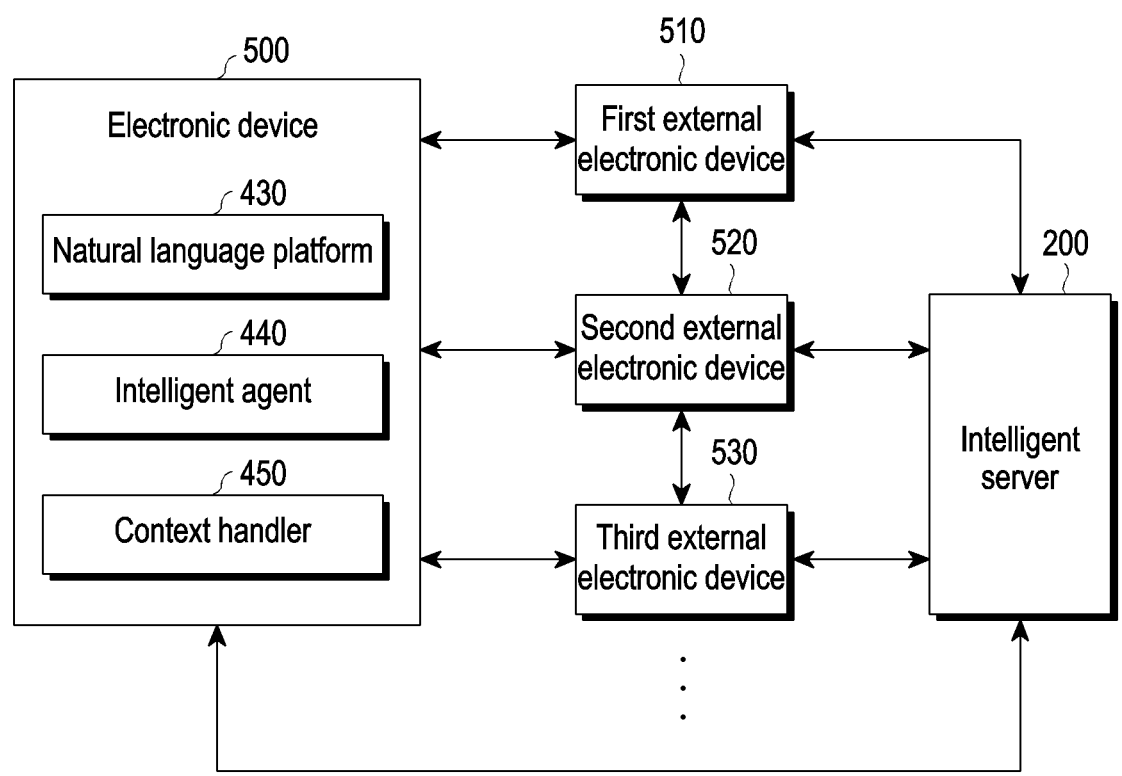
FIG. 4 is a block diagram of an on-device type electronic device for processing user utterances according to various embodiments.

FIG. 4 is a block diagram of an on-device type electronic device 500 for processing user utterances according to various embodiments.

According to various embodiments, an electronic device 500 may include the user terminal 100 in FIG. 1, and hereinafter, description will be made on the premise that the electronic device 500 is the user terminal 100. The electronic device 500 may establish a communication connection with a plurality of external electronic devices (e.g., a first external electronic device 510, a second external electronic device 520, and a third external electronic device 530) and the intelligent server 200 through a communication interface (e.g., the communication interface 110 in FIG. 1).

According to various embodiments, each of the plurality of external electronic devices 510, 520, and 530 may be an electronic device (e.g., the user terminal 100 in FIG. 1) for acquiring user utterances and performing a task corresponding to the user utterance. According to an embodiment, the electronic device 500 may establish a short-range wireless communication connection with the plurality of external electronic devices 510, 520, and 530. According to an embodiment, the electronic device 500 may be associated with the plurality of external electronic devices 510, 520, and 530 through a user account.

According to various embodiments, a memory (e.g., the memory 150 in FIG. 1) included in the electronic device 500 may store a natural language platform 430, an intelligent agent 440, and a context handler 450 in order to process user utterances in the electronic device 500. According to an embodiment, the natural language platform 430, the intelligent agent 440, and the context handler 450 stored in the memory 150 may be executed by a processor (e.g., the processor 160 in FIG. 1). According to an embodiment, the natural language platform 430, the intelligent agent 440, and the context handler 450 stored in the memory 150 may be implemented in hardware as well as software.

The processor 160 may execute the natural language platform 430 to execute a function of the natural language platform 220 included in the intelligent server 200 in FIG. 1. For example, the natural language platform 430 may include an automatic speech recognition module (e.g., the automatic speech recognition module 221 in FIG. 1), a natural language understanding module (e.g., the natural language understanding module 223 in FIG. 1), a planner module (e.g., the planner module 225 in FIG. 1), a natural language generator module (e.g., the natural language generator module 227 in FIG. 1), or a text-to-speech module (e.g., the text-to-speech module 229 in FIG. 1), and the electronic device 500 may execute the functions of the natural language platform 220 performed by the intelligent server 200.

According to an embodiment, a natural language understanding module (not shown) (e.g., the natural language understanding module 223 in FIG. 1) included in the natural language platform 430 may recognize user intent by executing syntactic analysis or semantic analysis. The syntactic analysis may be performed so as to divide a user input into syntactic units (e.g., words, phrases, morphemes, etc.) and recognize syntactic elements of the divided units. The semantic analysis may be performed using semantic matching, rule matching, formula matching, or the like. Accordingly, the natural language understanding module (not shown) included in the natural language platform 430 may acquire a domain corresponding to the user input, intent thereof, or parameters (or slots) required to express the intent.

According to an embodiment, the natural language understanding module (not shown) included in the natural language platform 430 may determine user intent and parameters using a matching rule that is divided into the domain, the intent, and the parameters (or the slots) required to recognize the intent. For example, the one domain (e.g., alarm) may include a plurality of intents (e.g., alarm configuration, alarm release, etc.), and one intent may include a plurality of parameters (e.g., time, the number of repetitions, alarm sound, etc.). A plurality of rules may include, for example, one or more essential element parameters. The matching rule may be stored in a natural language understanding database (NLU DB) (not shown).

According to an embodiment, the natural language understanding module (not shown) included in the natural language platform 430 may recognize the meaning of a word extracted from the user input using linguistic features (e.g., syntactic elements) such as morphemes, phrases, and the like, and may determine the user intent by matching the recognized meaning of the word to the domain and the intent. For example, the natural language understanding module (not shown) included in the natural language platform 430 may determine the user intent by calculating how many words extracted from the user input are included in each domain and intent. According to an embodiment, the natural language understanding module (not shown) included in the natural language platform 430 may determine the parameter of the user input using the word that is the basis for recognizing the intent. According to an embodiment, the natural language understanding module (not shown) included in the natural language platform 430 may determine the user intent using a natural language recognition database (not shown) that stores linguistic features for recognizing the intent of the user input. According to another embodiment, the natural language understanding module (not shown) included in the natural language platform 430 may determine the user intent using a personal language model (PLM). For example, the natural language understanding module (not shown) included in the natural language platform 430 may determine the user intent using personal information (e.g., a contact list and a music list). The personal language model may be stored, for example, in the natural language recognition database (not shown). According to an embodiment, in addition to the natural language understanding module (not shown) included in the natural language platform 430, the automatic speech recognition module (not shown) may also recognize the user voice with reference to the personal language model stored in the natural language recognition database (not shown).

The processor 160 may execute an intelligent agent 440 that is interworking with an intelligent app (e.g., a speech recognition app). The intelligent agent 440 interworking with the intelligent app may receive a user utterance as a voice signal, and may process the same. According to an embodiment, the intelligent agent 440 interworking with the intelligent app may be operated by a specific input (e.g., an input through a hardware key, an input through a touch screen, or a specific voice input) acquired through an input module (not shown) included in the electronic device 500. According to an embodiment, the processor 160 may execute the intelligent agent 440 to preprocess the user input (e.g., user utterance). According to an embodiment, in order to preprocess the user input, the intelligent agent 440 may include an adaptive echo canceller (AEC) module, a noise suppression (NS) module, an end-point detection (EPD) module, or an automatic gain control (AGC) module. The adaptive echo canceller module may remove the echo included in the user input. The noise suppression module may suppress the background noise included in the user input. The end-point detection module may detect the end point of a user voice included in the user input, thereby finding the portion where the user voice exists using the detected end point. The automatic gain control module may recognize the user input, and may adjust the volume of the user input to be suitable for processing the recognized user input. According to an embodiment, although the processor 160 may execute all of the preprocessing configurations for performance, in another embodiment, the processor 160 may execute some of the preprocessing configurations for low-power operation.

The processor 160 may identify context information by executing the context handler 450. According to various embodiments, the context handler 450 may identify context information related to the user utterance, and may select an external electronic device on the basis of the context information. The context handler 450 may generate context information related to the user utterance, and may transmit or receive the context information to or from the external electronic device.

According to various embodiments, the electronic device 500 may store context information in the memory 150.

According to various embodiments, the context information may include information on the user utterance. According to an embodiment, the context information may include (1) user utterance text information on the user utterance. The user utterance text information is user utterance information converted to text data by an automatic speech recognition module (not shown) included in the electronic device 500. According to an embodiment, the context information may include (2) information on at least one of the domain, the intent, or the parameter for the user utterance. According to an embodiment, the context information may include (3) information on the result of executing the task corresponding to the user utterance. According to an embodiment, the context information may include (4) domain state information corresponding to the user utterance. According to an embodiment, the context information may include (5) information on the executor device indicated by the user utterance. According to an embodiment, the context information may include (6) context history information, which will be described in detail with reference to FIG. 11. The context history information may include domain history information of the domain for the user utterance. The domain history information may include at least one piece of information (1) to (5) for at least one user utterance processed through a corresponding domain. According to an embodiment, identifiers (IDs) (e.g., a user utterance identifier (request ID), a domain ID, an intent ID, etc.) may be assigned to respective items in order to easily distinguish between the items of the context information.

According to various embodiments, the context information may include user information associated with a user who speaks. According to an embodiment, the context information may include at least one of account information of the user accessing the electronic device 500, a user service ID, or IoT account information (e.g., SmartThings). According to an embodiment, the context information may include information on a specific user utterance specified as a preferred utterance of the user, or information on a specific domain specified as a preferred domain of the user. According to an embodiment, the context information may include user personal information or user interest information. The user personal information may include at least one of the age, the gender, the family, and location information of the home or office of the user, location information of the user with time, information on user's preferred locations, the contact list, the schedule, and information on the installed apps. The user interest information may include information on the usage frequency of an app or a preferred app. The user interest information may include interest information identified on the basis of at least one of a web search history, a web access record, or an app usage record. The user interest information may include product information identified on the basis of at least one of a web search history, a web access record, text messages, or a user purchase history through the apps. The user interest information may include content information identified on the basis of at least one of a web search record, a web access record, or media playback information. The context information described above is not limited thereto, and may include a variety of information such as information capable of distinguishing between the users or information on user's preferences.

According to various embodiments, the context information may include device information of the electronic device 500 that acquires the user utterance. According to an embodiment, the context information may include information on the location of the electronic device 500. According to an embodiment, the context information may include information on at least one application installed in the electronic device 500 (e.g., an app installation list, app names, app attributes, app versions, or app download addresses). According to an embodiment, the context information may include information acquired through a sensor module (not shown) of the electronic device 500. According to an embodiment, the context information may include at least one piece of type information, ID information, or version information of the electronic device 500. According to an embodiment, the context information may include information on the executor device.

According to various embodiments, the context information may include session information indicating sessions. According to an embodiment, the session information may include session identifiers (conversation IDs or session IDs) to distinguish between sessions. According to an embodiment, the session information may include session activation information indicating whether or not the session is currently active or inactive in the electronic device 500. According to an embodiment, the session information may include time information on duration of the session. According to an embodiment, the session information may include last-utterance time information indicating the time at which the last user utterance is processed in the session. According to an embodiment, the sessions may be distinguished from each other on the basis of the time at which the intelligent app is executed to the time at which the intelligent app is terminated. According to an embodiment, the sessions may be distinguished from each other on the basis of a predetermined time elapsed from the time at which the user utterance is acquired. According to an embodiment, the sessions may be distinguished from each other by domains, by user utterances, and by a specific time. Distinguishing between the sessions is not limited to the examples described above, and the sessions may be distinguished variously by the configurations of users, manufacturers, or app developers. According to an embodiment, in the case where the sessions are distinguished from each other on the basis of a predetermined time elapsed from the time at which the user utterance is acquired, the sessions may be distinguished from each other on the basis of a predetermined time elapsed from the time at which the first user utterance is acquired after executing an intelligent app, or the sessions may be distinguished from each other on the basis of a predetermined time elapsed from the time at which the last user utterance is acquired after executing an intelligent application. In this case, the session identifiers (conversation IDs) may have the same ID during one session, and the user utterance identifiers (request IDs) may have different IDs between the respective user utterances. For example, during one session, identifiers (e.g., conversation ID=001 and request ID=8) for the first user utterance (e.g., "Play the latest song"), identifiers (conversation ID=001 and request ID=9) for the second user utterance (e.g., "Play the next song"), and identifiers (e.g., conversation ID=001 and request ID=10) for the third user utterance (e.g., "Pause the song") may be identified.

Figure 5:
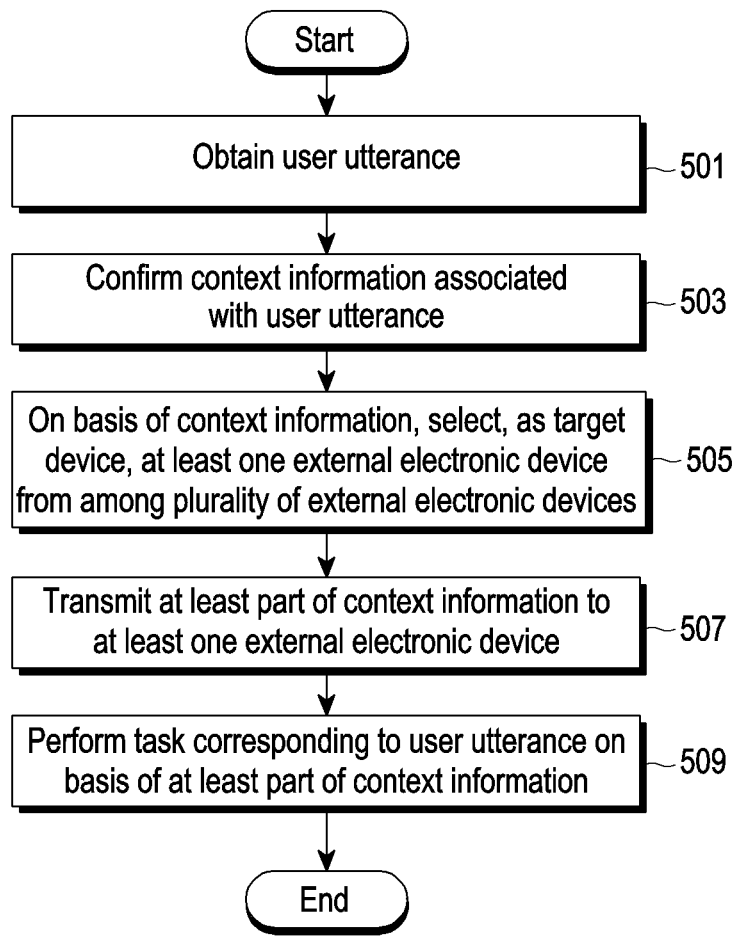
FIG. 5 is a flowchart illustrating a method in which an electronic device transmits context information related to a user utterance and performs a task corresponding to the user utterance according to various embodiments.

FIG. 5 is a flowchart illustrating a method in which an electronic device 500 transmits context information related to a user utterance and performs a task corresponding to the user utterance according to various embodiments.

Figure 6:
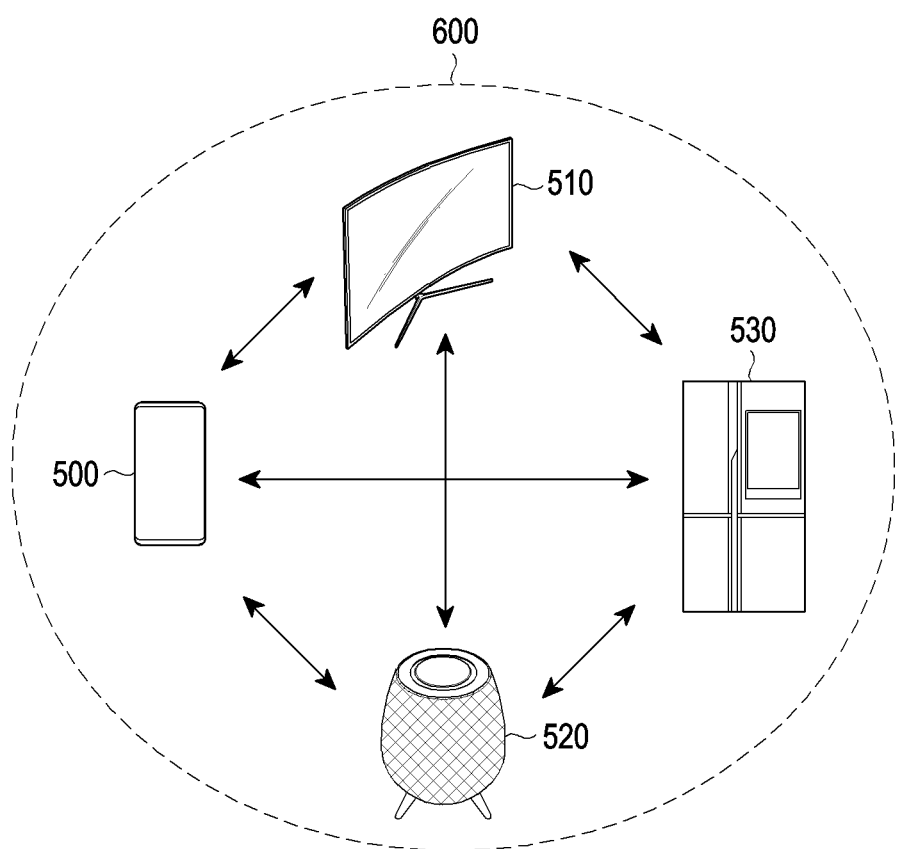
FIG. 6 is a diagram illustrating a plurality of external electronic devices establishing a short-range wireless communication connection with an electronic device according to various embodiments.

FIG. 6 is a diagram illustrating a plurality of external electronic devices (e.g., the first external electronic device 510 in FIG. 4, the second external electronic device 520 in FIG. 4, and the third external electronic device 530 in FIG. 4) establishing a short-range wireless communication connection with an electronic device 500 according to various embodiments.

In operation 501, according to various embodiments, an electronic device 500 (e.g., the processor 160 in FIG. 1) may acquire a user utterance. For example, after executing an intelligent agent (e.g., the intelligent agent 440 in FIG. 4), the electronic device 500 may acquire a user utterance from the user through a microphone (e.g., the microphone 120 in FIG. 1).

In operation 503, the electronic device 500 (e.g., the processor 160 in FIG. 1) may identify context information related to the user utterance.

According to various embodiments, after identifying the user utterance, the electronic device 500 (e.g., the processor 160 in FIG. 1) may identify context information corresponding to the user utterance. The context information corresponding to the user utterance may include the respective items of the context information described in FIG. 4.

In operation 505, according to various embodiments, the electronic device 500 (e.g., the processor 160 in FIG. 1) may select, as a target device, at least one external electronic device from among a plurality of external electronic devices on the basis of the context information.

According to various embodiments, the electronic device 500 (e.g., the processor 160 in FIG. 1) may select at least one external electronic device corresponding to information on a domain for the user utterance from among a plurality of external electronic devices 510, 520, and 530. According to an embodiment, each of the plurality of external electronic devices 510, 520, and 530 may be an electronic device (e.g., the user terminal 100 in FIG. 1) for acquiring the user utterance and executing the task corresponding to the user utterance. According to an embodiment, the electronic device 500 may establish a short-range wireless communication connection with the plurality of external electronic devices 510, 520, and 530. For example, referring to FIG. 6, the electronic device 500 may establish a short-range wireless communication network 600 with the plurality of external electronic devices 510, 520, and 530 through a communication interface (e.g., the communication interface 110 in FIG. 1) including a short-range wireless communication interface, and each of the plurality of external electronic devices 510, 520, and 530 may establish a short-range wireless communication network 600 with another external electronic device 510, 520, or 530. According to an embodiment, the electronic device 500 may be associated with the plurality of external electronic devices 510, 520, and 530 by a user account. For example, referring to FIG. 6, the plurality of external electronic devices 510, 520, and 530 may be accessing electronic devices using the same user account as the user account accessing the electronic device 500, or may be devices previously registered in the electronic device 500 (or the intelligent server 200) through a specific user account.

According to various embodiments, the electronic device 500 (e.g., the processor 160 in FIG. 1) may select, as a target device, at least one external electronic device corresponding to the domain for the user utterance. According to an embodiment, the electronic device 500 may select at least one external electronic device corresponding to the domain for the user utterance and the intent for the user utterance. According to an embodiment, the electronic device 500 may select at least one external electronic device corresponding to the attribute of the domain for the user utterance.

According to various embodiments, the electronic device 500 (e.g., the processor 160 in FIG. 1) may select, as a target device, at least one external electronic device corresponding to information on the user account. For example, the electronic device 500 may select at least one external electronic device indicating that it is in the connected state through the same user account.

According to various embodiments, the electronic device 500 (e.g., the processor 160 in FIG. 1) may select, as a target device, at least one external electronic device corresponding to information on an executor device. For example, the electronic device 500 may identify information on an executor device (e.g., TV) from the user utterance (e.g., "Play the searched song on the TV"), and may select, as the target device, at least one external electronic device corresponding to the information on the executor device. According to an embodiment, based on identifying that the second domain corresponding to the first domain for the user utterance acquired by the electronic device 500 is not supported by the executor device, the electronic device 500 may recommend another executor device supporting the second domain corresponding to the first domain for the user utterance to the user. The second domain corresponding to the first domain may be the same domain as the first domain, may be a domain compatible with the first domain, or may be a domain capable of processing the task corresponding to the user utterance acquired by the electronic device 500, but is not limited thereto. For example, the electronic device 500 that acquired a user utterance (e.g., "Play the searched music list on the refrigerator"), based on identifying that the second domain (e.g., the music application) corresponding to the first domain (e.g., the music application) for the user utterance is not installed in the executor device (e.g., the refrigerator), may recommend, to the user, another executor device (e.g., a speaker or TV) in which the second domain (e.g., the music application) is installed through the display or the speaker (e.g., output "Do you want to play it on the speaker or TV?"). According to an embodiment, based on identifying that the second intent of the second domain corresponding to the first intent of the first domain is not supported by the executor device, even though the second domain corresponding to the first domain for the user utterance acquired by the electronic device 500 is supported by the executor device, the electronic device 500 may recommend another executor device that supports the second intent of the second domain to the user. For example, based on identifying that the second intent (e.g., display a screen of the search result) of the second domain (e.g., a second music application) corresponding to the first intent (e.g., display a screen of the search result) of the first domain (e.g., a first music application) for the user utterance is not supported by the executor device (e.g., the speaker), the electronic device 500 having acquired the user utterance (e.g., "Show me the searched music list on the speaker") may recommend another executor device (e.g., TV) supporting the second intent of the second domain to the user (e.g., output "Do you want to see the searched music list on the TV?"). According to an embodiment, based on identifying that the second intent of the second domain corresponding to the first intent of the first domain is not supported by the executor device, even though the second domain corresponding to the first domain for the user utterance acquired by the electronic device 500 is supported by the executor device, the electronic device 500 may recommend another intent included in the second domain to the user. For example, based on identifying that the second intent (e.g., display a screen of the search result) of the second domain (e.g., a second music application) corresponding to the first intent (e.g., display a screen of the search result) of the first domain (e.g., a first music application) for the user utterance is not supported by the executor device (e.g., the speaker), the electronic device 500 having acquired the user utterance (e.g., "Show me the searched music list on the speaker") may recommend another intent (e.g., play the music) of the second domain to the user (e.g., output "Play the searched music list on the speaker?").

According to various embodiments, the electronic device 500 (e.g., the processor 160 in FIG. 1) may select, as a target device, at least one external electronic device corresponding to the context information using a device mapping table. According to an embodiment, the device mapping table may be pre-stored in a memory (e.g., the memory 150 in FIG. 1) of the electronic device 500. The device mapping table may include relationship information on a specific external electronic device corresponding to specific information included in the context information such that the electronic device 500 is able to identify the external electronic device to which the context information is transmitted. For example, if the first external electronic device 510 and the third external electronic device 530 have a first weather application installed therein and are equipped with a display, the electronic device 500 (e.g., a smartphone) may identify information on the first external electronic device 510 and the third external electronic device 530 corresponding to the domain (e.g., the first weather application) and the intent (e.g., display a search result on the screen) for the user utterance (e.g., "Show me the weather for one week") from the device mapping table. According to an embodiment, the device mapping table may include information on the external electronic devices that support respective domains and respective intents included in the respective domains. For example, in order to indicate devices in which app A is installed, the device mapping table may include relationship information indicating that app A corresponds to the first external electronic device 510 and the second external electronic device 520, or in order to indicate devices in which app B is installed, the device mapping table may include relationship information indicating that app B corresponds to the third external electronic device 530. As another example, in order to indicate devices that support the first intent included in app A, the device mapping table may include relationship information indicating that the first intent of app A corresponds to the first external electronic device 510, or in order to indicate devices that support the second intent included in app A, the device mapping table may include relationship information indicating that the second intent of app A corresponds to the second external electronic device 520. The device mapping table is not limited to the above examples, and may include information on the external electronic devices corresponding to each item of the context information shown in FIG. 4 or a combination of at least two thereof. According to an embodiment, the electronic device 500 may update the device mapping table using the context information acquired from each of the plurality of external electronic devices 510, 520, and 530. For example, if the electronic device 500 compares the context information acquired from the first external electronic device 510 at a first time with the context information acquired from the first external electronic device 510 at a second time prior to the first time to thus identify changed information, the electronic device 500 may update the device mapping table using the changed information. According to an embodiment, the electronic device 500 may periodically acquire the device mapping table from a server (e.g., the intelligent server 200 in FIG. 1).

In operation 507, according to various embodiments, the electronic device 500 (e.g., the processor 160 in FIG. 1) may transmit at least some of the context information to at least one external electronic device.

According to various embodiments, the electronic device 500 (e.g., the processor 160 in FIG. 1) may transmit at least some of the context information to at least one external electronic device on the basis of acquisition of a user utterance.

According to various embodiments, the electronic device 500 (e.g., the processor 160 in FIG. 1) may transmit at least some of the context information to at least one external electronic device according to a predetermined period.

According to various embodiments, based on identifying a change in the context information, the electronic device 500 (e.g., the processor 160 in FIG. 1) may transmit at least some context information to at least one external electronic device. For example, if location information of the electronic device 500 is changed, if a specific application is newly installed in the electronic device 500 or a specific application is removed therefrom, or if the attribute (version) of a specific domain is updated, the electronic device 500 may transmit at least some of the context information to at least one external electronic device.

According to various embodiments, the electronic device 500 (e.g., the processor 160 in FIG. 1) may convert the format of at least some of the context information to be transmitted into the format capable of being executed by the receiving external electronic device, and may then transmit the context information in the converted format to the external electronic device. For example, referring to FIG. 6, the electronic device 500 (e.g., a smartphone) may convert the format (e.g., the format for outputting a screen) of the context information into the format (e.g., the format for outputting a voice) capable of being executed by the second external electronic device 520 (e.g., a smart speaker), and may then transmit the context information in the converted format to the second external electronic device 520.

In operation 509, according to various embodiments, based on at least some of the context information, the electronic device 500 (e.g., the processor 160 in FIG. 1) may perform the task corresponding to the user utterance. According to an embodiment, based on at least some of the context information identified by analyzing the user utterance, the electronic device 500 may execute the task corresponding to the user utterance.

According to various embodiments, the electronic device 500 (e.g., the processor 160 in FIG. 1) may execute operation 509 at any time after performing operation 503. For example, the electronic device 500 may perform operation 509 after performing operation 503 and before performing operation 505, and may simultaneously perform operation 509 with operation 505 or operation 507. The sequence of performing operation 509 is not limited to the above examples, and operation 509 may be performed in various orders according to the configuration of the user, the manufacturer, or the app developer.

Figure 7:
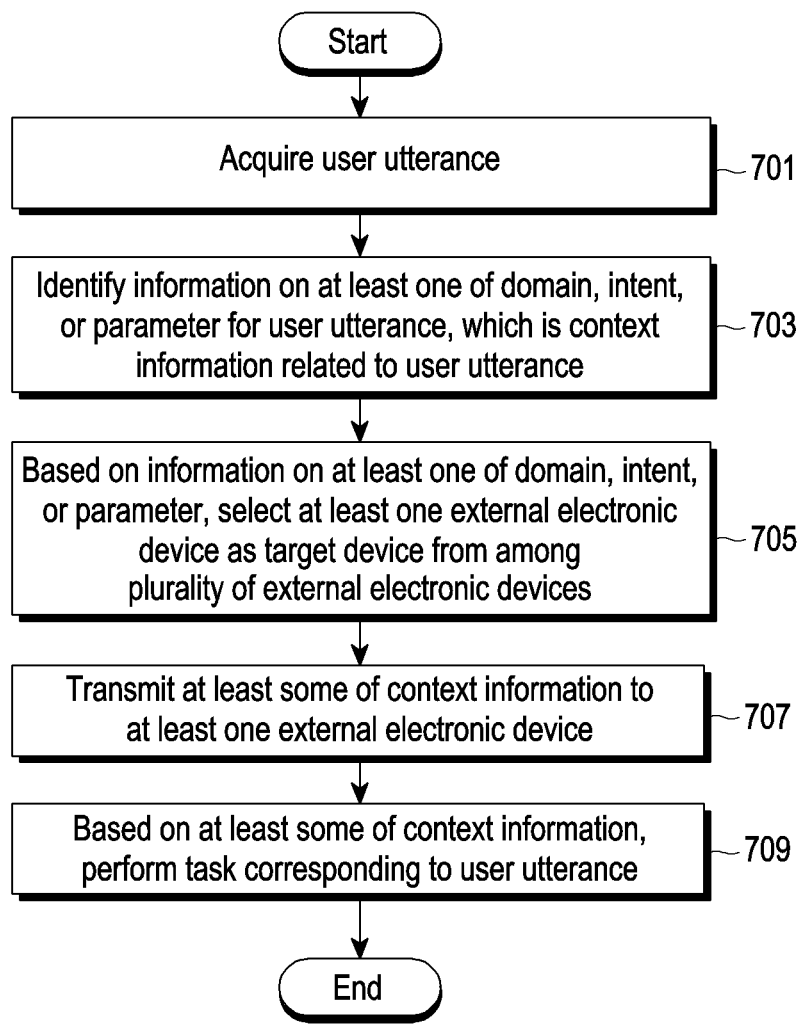
FIG. 7 is a flowchart illustrating a method in which an electronic device selects at least one external electronic device on the basis of information on at least one of a domain, an intent, or a parameter for a user utterance according to various embodiments.

FIG. 7 is a flowchart illustrating a method in which an electronic device (e.g., the electronic device 500 in FIG. 4) selects at least one external electronic device on the basis of information on at least one of a domain, an intent, or a parameter for a user utterance (e.g., the user utterance 801 in FIG. 8) according to various embodiments.

Figure 8:
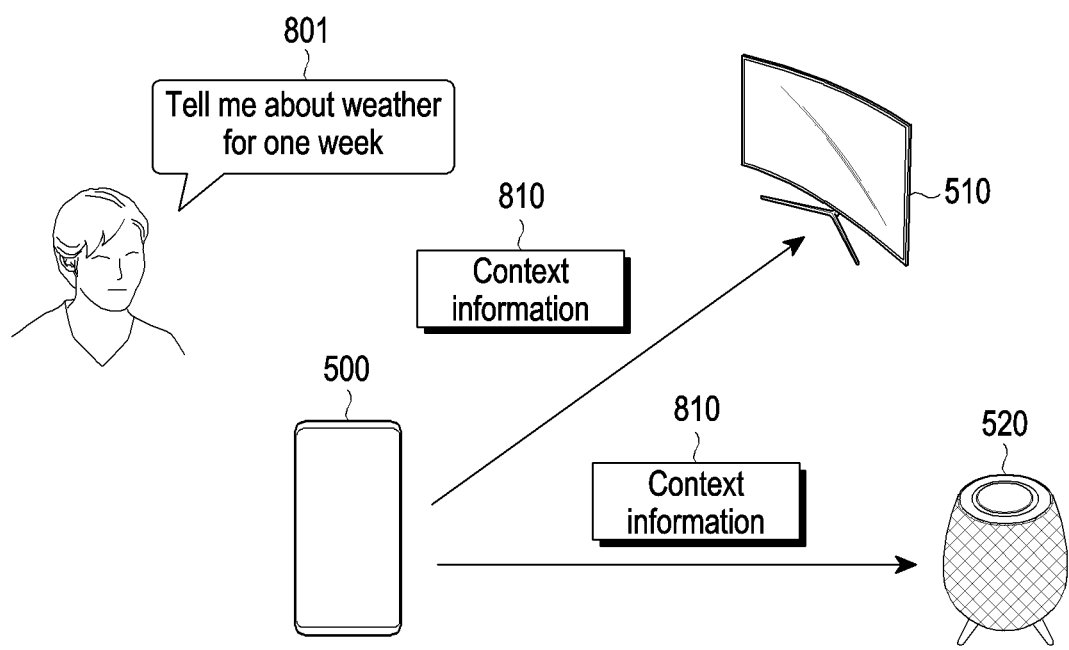
FIG. 8 is a diagram illustrating an embodiment in which an electronic device transmits context information related to a user utterance according to various embodiments.

FIG. 8 is a diagram illustrating an embodiment in which an electronic device 500 transmits context information (e.g., the context information 810 in FIG. 8) related to a user utterance 801 according to various embodiments.

In operation 701, according to various embodiments, an electronic device 500 (e.g., the processor 160 in FIG. 1) may acquire a user utterance. For example, referring to FIG. 8, the electronic device 500 may execute an intelligent agent (e.g., the intelligent agent 440 in FIG. 4) to acquire a user utterance 801 (e.g., "Tell me about the weather for one week") through a microphone (e.g., the microphone 120 in FIG. 1).

In operation 703, the electronic device 500 (e.g., the processor 160 in FIG. 1) may identify information on at least one of the domain, the intent, or the parameter for the user utterance 801, which is context information 810 related to the user utterance 801. For example, referring to FIG. 8, the electronic device 500 may analyze the user utterance 801, thereby identifying the domain (e.g., a weather application), the intent (e.g., providing a search result), and the parameter (e.g., one week) for the user utterance 801.

According to various embodiments, the electronic device 1000 (e.g., the processor 160 in FIG. 1) may identify information on the location of the electronic device 500 related to the user utterance 801, which is the context information 810 related to the user utterance 801. For example, referring to FIG. 8, the electronic device 500 may identify, using a GPS module, location information (e.g., Seoul) of the electronic device 500 at the time of acquiring the user utterance 801 or at the time of performing the task corresponding to the user utterance 801.

In operation 705, according to various embodiments, based on information on at least one of the domain, the intent, or the parameter for the user utterance 801, the electronic device 500 (e.g., the processor 160 in FIG. 1) may select at least one external electronic device as a target device from among a plurality of external electronic devices (e.g., the first external electronic device 510 in FIG. 8 and the second external electronic device 520 in FIG. 8).

According to various embodiments, an electronic device 1000 (e.g., the processor 160 in FIG. 1) may select at least one external electronic device corresponding to the domain for the user utterance 801 as the target device. In this case, the electronic device 500 may select at least one external electronic device supporting a second domain corresponding to a first domain for the user utterance 801. The second domain corresponding to the first domain may be the same domain as the first domain, may be a domain compatible with the first domain, or may be a domain capable of processing the task corresponding to the user utterance acquired by the electronic device 500, but is not limited to the above examples. For example, referring to FIG. 8, the electronic device 500 may select, as target devices, a first external electronic device 510 (e.g., a smart TV) and/or a second external electronic device 520 (e.g., a smart speaker) in which a second domain (e.g., a second weather application) corresponding to a first domain (e.g., a first weather application) for the user utterance 801 is installed.

According to various embodiments, the electronic device 1000 (e.g., the processor 160 in FIG. 1) may select, as a target device, at least one external electronic device corresponding to the attribute of the domain for the user utterance 801. In this case, the electronic device 500 may select at least one external electronic device supporting the attribute of the second domain corresponding to the attribute of the first domain for the user utterance 801. The attribute of the second domain corresponding to the attribute of the first domain may be the same domain version as the version of the first domain, may be the domain version compatible with the version of the first domain, or may be the domain version capable of processing the task corresponding to the user utterance obtained in the electronic device 500, but is not limited thereto. For example, referring to FIG. 8, the electronic device 500 may select, as a target device, the first external electronic device 510 and/or the second external electronic device 520 in which the second domain (e.g., a second weather application of a first version) corresponding to the first domain (e.g., a first weather application of a first version) for the user utterance 801 is installed.

According to various embodiments, the electronic device 1000 (e.g., the processor 160 in FIG. 1) may select, as a target device, at least one external electronic device corresponding to the domain and the intent for the user utterance 801. In this case, the electronic device 500 may select at least one external electronic device capable of supporting the second domain corresponding to the first domain for the user utterance 801 and performing the intent for the user utterance 801. For example, the external electronic device (e.g., a smart TV) in which the second domain (e.g., the second weather application) corresponding to the first domain (e.g., the first weather application) for the user utterance (e.g., "Show me the weather for one week") is installed and that is able to perform the intent (e.g., displaying a search result on the screen) for the user utterance may be selected as the target device.

In operation 707, according to various embodiments, the electronic device 500 (e.g., the processor 160 in FIG. 1) may transmit at least some of the context information 810 related to the user utterance to at least one external electronic device selected as the target device.

According to various embodiments, the electronic device 500 (e.g., the processor 160 in FIG. 1) may transmit context information 810 including information on at least one of the domain, the intent, or the parameter for the user utterance 801 to at least one external electronic device. For example, referring to FIG. 8, the context information 810 including information on the domain (e.g., a weather application), the intent (e.g., providing a search result), and the parameter (e.g., one week) for the user utterance 801 may be transmitted to the first external electronic device 510 and/or the second external electronic device 520.

According to various embodiments, the electronic device 500 (e.g., the processor 160 in FIG. 1) may transmit context information 810 including information on the location of the electronic device 500 to at least one external electronic device. For example, referring to FIG. 8, the electronic device 500 may transmit context information 810 including location information (e.g., Seoul) of the electronic device 500 at the time of acquiring the user utterance 801 to the first external electronic device 510 and/or the second external electronic device 520.

According to various embodiments, the electronic device 500 (e.g., the processor 160 in FIG. 1) may transmit context information 810 including information on the result of performing the task corresponding to the user utterance 801 to at least one external electronic device. For example, referring to FIG. 8, the electronic device 500 may transmit context information 810 including information on the result of performing the task corresponding to the user utterance 801 (e.g., the search api representing weather information in Seoul for one week) to the first external electronic device 510 and/or the second external electronic device 520.

According to various embodiments, the electronic device 500 (e.g., the processor 160 in FIG. 1) may transmit context information 810 including domain status information corresponding to the user utterance 801 to at least one external electronic device. For example, referring to FIG. 8, the electronic device 500 may transmit context information 810 including domain status information corresponding to the user utterance 801 (e.g., the screen state of displaying weather information of Seoul for one week in the weather application) to the first external electronic device 510 and/or the second external electronic device 520.

According to various embodiments, the electronic device 500 (e.g., the processor 160 in FIG. 1) may transmit context information 810 including domain history information of the domain for the user utterance 801 to at least one external electronic device. For example, referring to FIG. 8, the electronic device 500 may transmit context information 810 including domain history information of the domain (e.g., the weather application) corresponding to the user utterance 801 (e.g., processing information on the user utterances before the user utterance 801 in the weather application) to the first external electronic device 510 and/or the second external electronic device 520.

In operation 709, according to various embodiments, based on at least some of the context information 810 related to the user utterance 801, the electronic device 500 (e.g., the processor 160 in FIG. 1) may perform the task corresponding to the user utterance 801. For example, referring to FIG. 8, the electronic device 500 may analyze the user utterance 801 to identify information on the location (e.g., Seoul) of the electronic device 500 at the time of acquiring the user utterance 801, and the domain (e.g., the weather application), the intent (e.g., providing a search result), and the parameter (e.g., one week) for the user utterance 801, and the electronic device 500 may output the weather information of Seoul for one week, which is searched for by the weather application, through the speaker and the screen of the electronic device 500.

According to various embodiments, the electronic device 500 (e.g., the processor 160 in FIG. 1) may perform operation 709 at any time after performing operation 703. For example, the electronic device 500 may perform operation 709 after performing operation 703 and before performing operation 705, or may simultaneously perform operation 709 with operation 705 or operation 707. The sequence of performing operation 709 is not limited to the above examples, and operation 709 may be performed in various orders according to the configuration of the user, the manufacturer, or the app developer.

Figure 9:
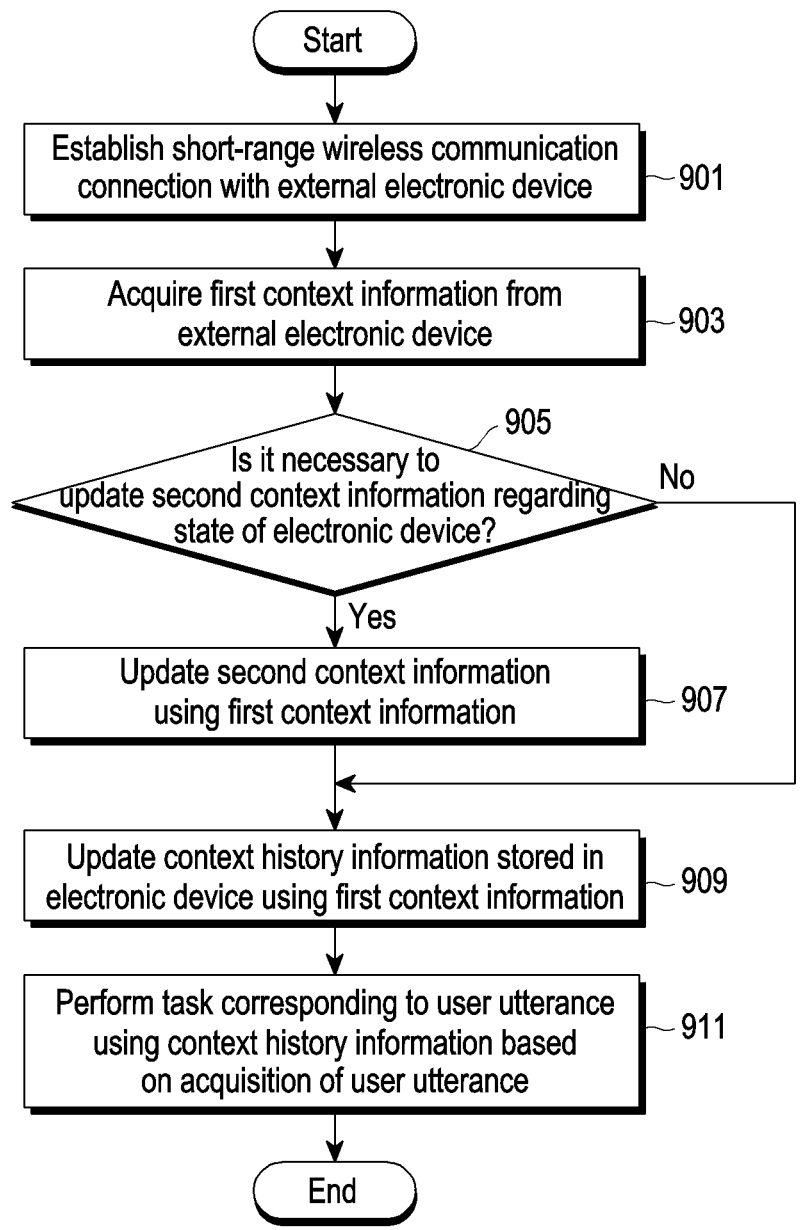
FIG. 9 is a flowchart illustrating a method in which an electronic device updates context history information stored in the electronic device using first context information obtained from an external electronic device according to various embodiments.

FIG. 9 is a flowchart illustrating a method in which an electronic device (e.g., the electronic device 1000 in FIG. 10) updates context history information (e.g., the context history information 1101) stored in the electronic device 1000 using first context information (e.g., the first context information 1010 in FIG. 10) obtained from an external electronic device (e.g., the external electronic device 1001 in FIG. 10) according to various embodiments. The electronic device 1000 and the external electronic device 1001 may include the user terminal 100 in FIG. 1.

Figure 10:
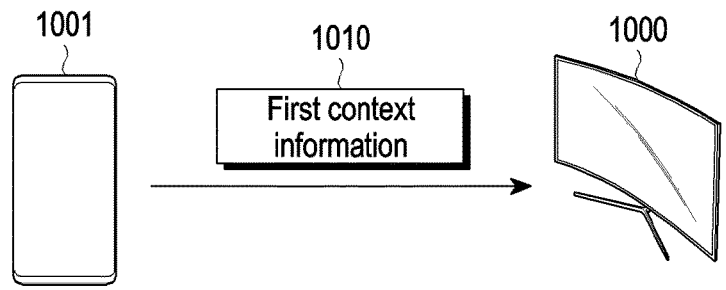
FIG. 10 is a diagram illustrating an example in which an electronic device obtains first context information from an external electronic device according to various embodiments.

FIG. 10 is a diagram illustrating an example in which an electronic device 1000 obtains first context information 1010 from an external electronic device 1001 according to various embodiments.

Figure 11:
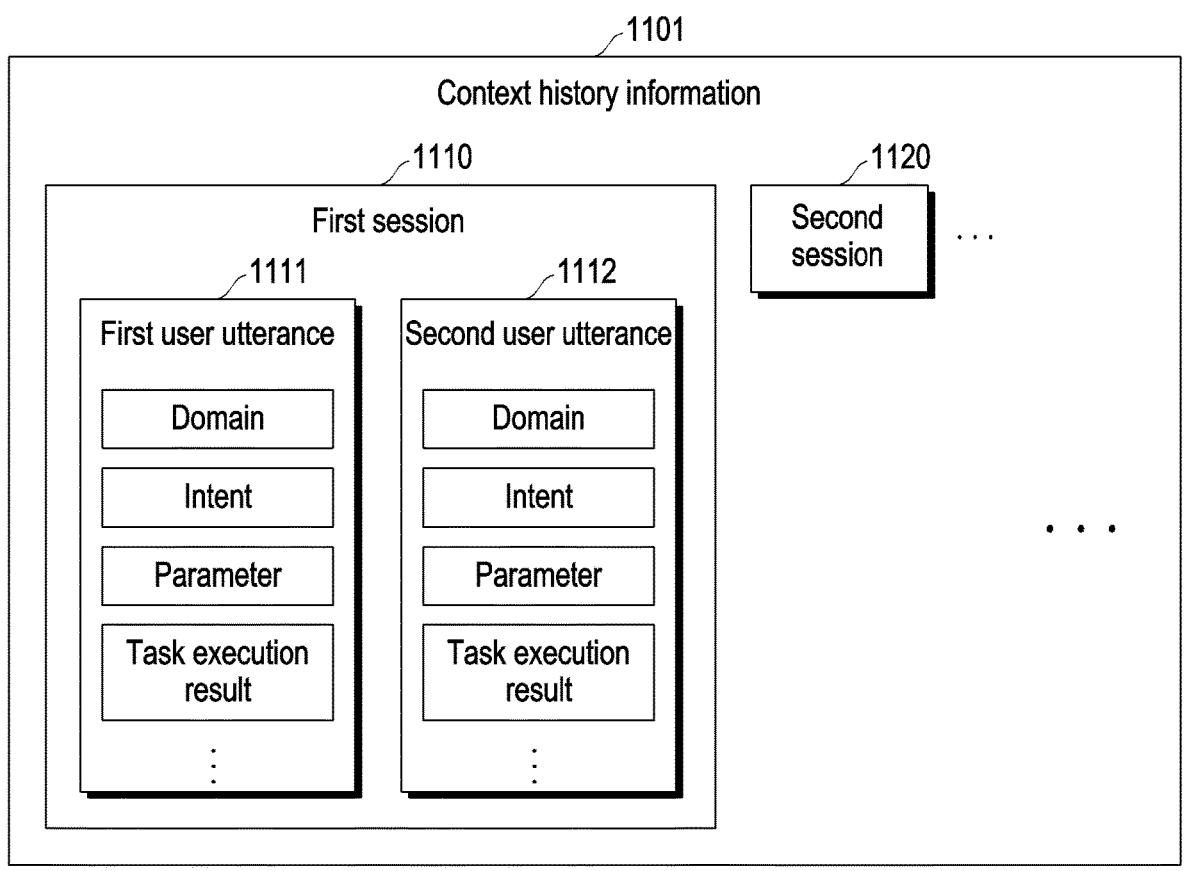
FIG. 11 is a diagram illustrating context history information stored in a memory of an electronic device according to various embodiments.

FIG. 11 is a diagram illustrating context history information 1101 stored in a memory (e.g., the memory 150 in FIG. 1) of an electronic device 1000 according to various embodiments.

In operation 901, according to various embodiments, an electronic device 1000 (e.g., the processor 160 in FIG. 1) may establish a short-range wireless communication connection with an external electronic device 1001 for acquiring a user utterance and performing the task corresponding to the user utterance through a communication interface (e.g., the communication interface 110 in FIG. 1) including a short-range wireless communication interface. According to an embodiment, the external electronic device 1001 may be a device related to the user account of the electronic device 1000.

In operation 903, according to various embodiments, the electronic device 1000 (e.g., the processor 160 in FIG. 1) may acquire first context information 1010 from the external electronic device 1001 through the communication interface (e.g., the communication interface 110 in FIG. 1). According to an embodiment, the first context information 1010 may include the context information described in FIG. 5. For example, referring to FIG. 10, the first context information 1010 may include at least one piece of (1) first user utterance text information acquired by the external electronic device 1001 (e.g., "Show me the weather for one week on TV"), (2) information on at least one of the domain (e.g., the weather application), the intent (e.g., displaying a search result on the screen), or the parameter (e.g., one week) for the first user utterance, (3) information on the result of performing the task corresponding to the first user utterance (e.g., the search api representing weather information of Seoul for one week), (4) domain status information corresponding to the first user utterance (e.g., the screen state of displaying weather information of Seoul for one week in the weather application), (5) information on the location (e.g. Seoul) of the external electronic device 1001, (6) information on the executor device (e.g., TV) indicated by the first user utterance, or (7) domain history information on the first user utterance. According to an embodiment, (7) the domain history information for the first user utterance may include information (1) to (6) for at least one previous user utterance (e.g., the user utterances before acquiring the first user utterance) of the corresponding domain (e.g., the weather application). According to various embodiments, the first context information 1010 is not limited to the examples described above, and may include the context information described in FIG. 4.

In operation 905, according to various embodiments, based on the first context information 1010, the electronic device 1000 (e.g., the processor 160 in FIG. 1) may identify whether or not it is necessary to update second context information regarding the state of the electronic device 1000. The second context information may include the context information described in FIG. 4.

According to various embodiments, the electronic device 1000 (e.g., the processor 160 in FIG. 1) may identify information on the first domain included in the first context information 1010, and, based on the fact that the second domain corresponding to the first domain is running in the electronic device 1000, may identify that the second context information on the state of the electronic device 1000 is required to be updated. For example, the electronic device 1000 may identify information on the first domain (e.g., the first weather application) from first context information 1010, and, based on the fact that the second domain (e.g., the second weather application) corresponding to the first domain is currently running in the electronic device 1000, may identify that update of the second context information is required. The second domain corresponding to the first domain may be the same domain as the first domain, may be a domain compatible with the first domain, or may be a domain capable of processing the task corresponding to the user utterance acquired by the electronic device 500, but is not limited to the above examples.

According to various embodiments, the electronic device 1000 (e.g., the processor 160 in FIG. 1) may identify information on the first domain included in first context information 1010, and, based on identifying that the attribute (version) of the first domain does not correspond to the attribute (version) of the second domain, may identify that the second context information on the state of the electronic device 1000 is required to be updated. For example, the electronic device 1000 may identify the version of the first domain (e.g., the first weather application) from the first context information 1010, and, based on identifying that the version of the first domain does not correspond to the version of the second domain (e.g., the second weather application), may identify that update of the second context information is required.

According to various embodiments, the electronic device 1000 (e.g., the processor 160 in FIG. 1) may identify information on the executor device included in the first context information 1010, and, based on identifying that the information on the executor device corresponds to the electronic device 1000, may identify that the second context information on the state of the electronic device 1000 is required to be updated. For example, the electronic device 1000 may identify information indicating an executor device (e.g., TV) to perform the task corresponding to the user utterance from the first context information 1010, and based on identifying that the information on the executor device corresponds to the electronic device 1000, may identify that the second context information on the state of the electronic device 1000 is required to be updated.

According to various embodiments, the electronic device 1000 (e.g., the processor 160 in FIG. 1) may identify information on at least one application included in the first context information 1010, and, based on identifying that some of the information on at least one application does not correspond to information on the application installed in the electronic device 1000, may identify that the second context information on the state of the electronic device 1000 is required to be updated. For example, the electronic device 1000 may identify at least one application installed in the external electronic device 1001 from the first context information 10101, and, based on identifying that at least one application installed in the external electronic device 1001 is not installed in the electronic device 1000, may identify that the second context information on the state of the electronic device 1000 is required to be updated.

In operation 907, according to various embodiments, based on identifying that the update of the second context information is required, the electronic device 1000 (e.g., the processor 160 in FIG. 1) may update the second context information using the first context information 1010.

According to various embodiments, based on the fact that the second domain corresponding to the information on the first domain included in first context information 1010 is running in the electronic device 1000, the electronic device 1000 (e.g., the processor 160 in FIG. 1) may apply information on the task execution result (e.g., the search api) included in the first context information 1010 or first domain status information (e.g., a specific screen state of an app) to the second domain, thereby updating second domain status information.

According to various embodiments, based on the fact that information on the executor device included in the first context information 1010 corresponds to the electronic device 1000, the electronic device 1000 (e.g., the processor 160 in FIG. 1) may launch the second domain corresponding to the information on the first domain included in first context information 1010, and may apply information on the task execution result included in the first context information 1010 or the first domain status information to the second domain, thereby updating the second domain status information. According to an embodiment, based on the fact that information on the executor device included in first context information 1010 corresponds to the electronic device 1000, the electronic device 1000 may perform the task corresponding to the user utterance by directly analyzing user utterance information included in first context information 1010.

According to various embodiments, after updating the second domain status information, the electronic device 1000 (e.g., the processor 160 in FIG. 1) may re-update the second domain status information corresponding to the user input acquired by the electronic device 1000 using domain history information for the first domain, which is included in the first context information 1010. For example, referring to FIG. 10, the external electronic device 1001 may sequentially perform the tasks corresponding to the acquired first user utterance (e.g., "Show me the social news"), second user utterance (e.g., "Show me the entertainment news"), and third user utterance (e.g., "Show me the economic news") through the first domain (e.g., a news application), and, based on a final user utterance (e.g., "Show me that on the TV") acquired by the external electronic device 1001, the electronic device 1000 may acquire the first context information 1010 including domain history information of the first domain (e.g., each piece of domain status information corresponding to each of the user utterances sequentially processed by the news application (e.g., a social news screen, an entertainment news screen, and an economic news screen)) for the final user utterance. The electronic device 1000 may launch the second domain (e.g., execute the news application) corresponding to information on the first domain for the final user utterance, and may apply first domain status information of the first domain for the final user utterance to the second domain, thereby updating the second domain status information (e.g., display the economic news screen). After updating the second domain status information, based on obtaining an additional user input (e.g., a touch input (e.g., go to the previous page) or a voice input (e.g., "Show me the previous page" and "Show me the previous page of that")) regarding the second domain, the electronic device 1000 may apply information on the task execution result corresponding to the previous user utterances (e.g., "Show me the social news" and "Show me the entertainment news") included in the domain history information for the first domain or domain status information (e.g., the social news screen and the entertainment news screen) corresponding to the previous user utterances to the current domain status information of the second domain (e.g., the economic news screen), thereby sequentially re-update the second domain status information corresponding to the additional user input (e.g., displaying the social news after displaying the entertainment news). According to an embodiment, in the case of updating the domain status information of the second domain using the domain history information of the first domain, the electronic device 1000 may determine whether or not to apply the previous user input acquired through the first domain to the second domain. For example, the electronic device 1000 may acquire an additional user input (e.g., "Show me the previous page" as a voice input) using the domain history information of the first domain (e.g., a web browser) while displaying specific domain status information (e.g., a screen obtained by searching for a keyword "A") on the second domain (e.g., the web browser). In the case of updating the current domain status information of the second domain using the previous domain status information (e.g., the screen before searching for the keyword "A") included in the domain history information of the first domain, based on obtaining the additional user input, the electronic device 1000 may apply the previous user input (e.g., the keyword "A") acquired through the first domain to the current domain status information of the second domain, thereby updating the domain status information corresponding to the additional user input (e.g., the screen before searching for the keyword "A" even though the keyword "A" was input into a search window). Alternatively, in the case of updating the current domain status information of the second domain using the previous domain status information (e.g., the screen before searching for the keyword "A") included in the domain history information of the first domain, the electronic device 1000 may not apply the previous user input (e.g., the keyword "A") acquired through the first domain to the current domain status information of the second domain, thereby updating the domain status information corresponding to the additional user input (e.g., the screen before searching for the keyword "A" when the keyword "A" is not input into the search window). According to an embodiment, the domain history information may include information on various user inputs acquired from the user in a specific domain status information of the corresponding domain.

According to various embodiments, based on the fact that the second domain corresponding to the information on the first domain included in the first context information 1010 is running in the electronic device 1000, the electronic device 1000 (e.g., the processor 160 in FIG. 1) may apply information on the task execution result (e.g., the search api) included in the first context information 1010 or the first domain status information (e.g., a specific screen state of the app) to the second domain, thereby updating the second domain status information.

According to various embodiments, based on identifying that the attribute (version) of the first domain included in the first context information 1010 does not correspond to the attribute (version) of the second domain of the electronic device 1000, the electronic device 1000 (e.g., the processor 160 in FIG. 1) may update the attribute (version) of the second domain with the attribute (version) of the first domain.

According to various embodiments, based on identifying that information on at least one application included in the first context information 1010 does not correspond to information on the application installed in the electronic device 1000, the electronic device 1000 (e.g., the processor 160 in FIG. 1) may install, in the electronic device 1000, the application that is not installed in the electronic device 1000, among one or more applications included in the first context information 1010, and may update an application installation list.

According to various embodiments, after changing the format of the first context information 1010 to the format capable of being executed in the electronic device 1010, the electronic device 1000 (e.g., the processor 160 in FIG. 1) may update the second context information using the first context information 1010. For example, the electronic device 1000 (e.g., a smart TV) may change the format of the first context information 1010 (e.g., a format for audio output) acquired from the external electronic device (e.g., a smart speaker) to the format capable of being executed in the electronic device 1000 (e.g., a format for screen output), and may then update the second context information using the first context information 1010 in the changed format.

In operation 909, according to various embodiments, the electronic device 1000 (e.g., the processor 160 in FIG. 1) may update context history information 1101 stored in the electronic device 1000 using the first context information 1010. According to an embodiment, the electronic device 1000 may update context history information 1101 stored in the electronic device 1000 using at least some of the first context information 1010 acquired from the external electronic device 1001.

According to various embodiments, the context history information 1101 may include at least one piece of session information (e.g., first session information 1110 and/or second session information 1120 in FIG. 11) including at least one piece of user utterance information (e.g., first user utterance information 1111 and/or second user utterance information 1112 in FIG. 11). According to an embodiment, the respective pieces of session information (e.g., the first session information 1110 and the second session 1120) may have different session IDs from each other (e.g., session IDs or conversation IDs), which are assigned thereto, and the respective pieces of user utterance information (e.g., the first user utterance information 1111 and the second user utterance information 1112) may have different user utterance IDs from each other (e.g., request IDs), which are assigned thereto. According to an embodiment, each piece of user utterance information (e.g., the first user utterance information 1111 or the second user utterance information 1112) may include at least one of (1) user utterance text information for the user utterance, (2) at least one of the domain, the intent, or the parameter for the user utterance, (3) the result of executing the task corresponding to the user utterance, or (4) domain status information corresponding to the user utterance. According to an embodiment, respective pieces of user utterance information (e.g., the first user utterance information 1111 and the second user utterance information 1112) included in the context history information 1101 may be classified by session information, and user utterance information classified into respective sessions may be arranged in the order of the time at which the user utterances are acquired. According to an embodiment, the respective pieces of user utterance information (e.g., the first user utterance information 1111 and the second user utterance information 1112) included in the context history information 1101 may be classified by the respective domains supported by the electronic device 1000, and the user utterance information classified into the respective domains may be arranged in the order of the time at which the user utterances are acquired. In this case, the form in which the user utterances are classified by the domains in the context history information may denote the domain history information. According to various embodiments, the context history information 1101 is not limited to the example described above, and may include all items of the context information described in FIG. 4. According to various embodiments, the context history information 1101 may be classified by the respective items included in the context information, as well as by the session or the domain in the above example.

According to various embodiments, based on identifying that the second context information does not need to be updated, the electronic device 1000 (e.g., the processor 160 in FIG. 1) may update the context history information 1101 stored in the electronic device 1000 using the first context information 1010. According to an embodiment, based on the fact that the second domain corresponding to the information on the first domain included in the first context information 1010 is not running in the electronic device 1000, the electronic device 1000 may add the first context information 1010 to the context history information 1101 according to a predetermined arrangement rule (e.g., arrangement in the order of time for each domain). According to an embodiment, based on the fact that the information on the executor device included in the first context information 1010 does not correspond to the electronic device 1000, the electronic device 1000 may add the first context information 1010 to the context history information 1101 according to a predetermined arrangement rule (e.g., arrangement in the order of time for each domain).

According to various embodiments, based on identifying that the second context information is required to be updated, the electronic device 1000 (e.g., the processor 160 in FIG. 1) may update the second context information and the context history information 1101 using the first context information 1010. According to an embodiment, the electronic device 1000 may update the context history information 1101 using the first context information 1010 after updating the second context information. According to an embodiment, after updating the second context information, the electronic device 1000 may add the first context information 1010 to the context history information 1101 according to a predetermined arrangement rule (e.g., arrangement in the order of time for each domain).

In operation 911, according to various embodiments, based on the acquisition of the user utterance, the electronic device 1000 (e.g., the processor 160 in FIG. 1) may perform the task corresponding to the user utterance using the context history information 1101. According to an embodiment, after executing an intelligent agent (e.g., the intelligent agent 440 in FIG. 4), the electronic device 1000 may acquire a user utterance through a microphone (e.g., the microphone 120 in FIG. 1). According to an embodiment, the electronic device 1000 may identify the user utterance from the first context information 1010 including the user utterance acquired by the external electronic device 1001.

According to various embodiments, based on identifying information on the domain for the user utterance, the electronic device 1000 (e.g., the processor 160 in FIG. 1) may perform the task corresponding to the user utterance using the domain history information included in the context history information 1101. For example, based on identifying that the domain for the user utterance is the first domain, the electronic device 1000 may perform the task corresponding to the user utterance using the domain history information for the first domain.

Figure 12:
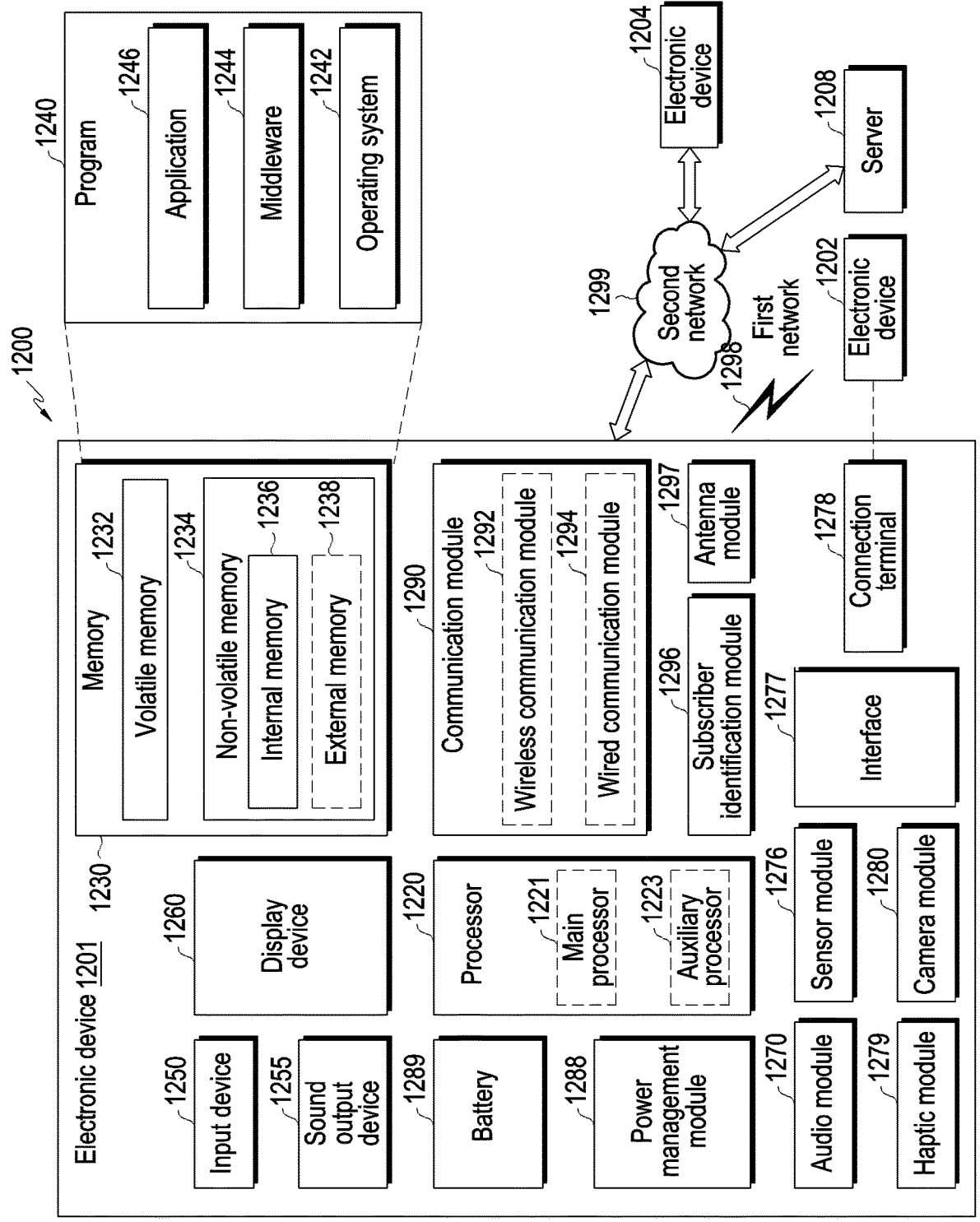
FIG. 12 is a block diagram of an electronic device in a network environment according to various embodiments.

FIG. 12 is a block diagram illustrating an electronic device 101 (e.g., the user terminal 100 of FIG. 1) in a network environment 1200 according to various embodiments. Referring to FIG. 12, the electronic device 101 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 101 may communicate with the electronic device 1204 via the server 1208. According to an embodiment, the electronic device 101 may include a processor 1220, memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 101, or one or more other components may be added in the electronic device 101. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 101 coupled with the processor 1220, and may perform various data processing or computation. According to one embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control, for example, at least some of functions or states related to at least one component (e.g., the display device 1260, the sensor module 1276, or the communication module 1290) among the components of the electronic device 101, instead of the main processor 1221 while the main processor 1221 is in an inactive (e.g., sleep) state, or together with the main processor 1221 while the main processor 1221 is in an active (e.g., executing an application) state. According to an embodiment, the auxiliary processor 1223 (e.g., an image signal processor or a communication processor) may be implemented as part of another component (e.g., the camera module 1280 or the communication module 1190) functionally related to the auxiliary processor 1223.

The memory 1230 may store various data used by at least one component (e.g., the processor 1220 or the sensor module 1276) of the electronic device 101. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by a component (e.g., the processor 1220) of the electronic device 101, from the outside (e.g., a user) of the electronic device 101. The input device 1250 may include, for example, a microphone, a mouse, a keyboard, or a digital pen (e.g., a stylus pen).

The sound output device 1255 may output sound signals to the outside of the electronic device 101. The sound output device 1255 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 1260 may visually provide information to the outside (e.g., a user) of the electronic device 101. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or an external electronic device (e.g., an electronic device 1202 (e.g., a speaker or a headphone)) directly or wirelessly coupled with the electronic device 101.

The sensor module 1276 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 101 to be coupled with the external electronic device (e.g., the electronic device 1202) directly or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 101 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image and moving images. According to an embodiment, the camera module 1280 may include one or more lenses, image sensors, image signal processors, or flashes.

The power management module 1288 may manage power supplied to the electronic device 101. According to one embodiment, the power management module 1288 may be implemented as at least part of, for example, a power management integrated circuit (PMIC).

The battery 1289 may supply power to at least one component of the electronic device 101. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 101 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and support a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 101 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 1297 may include a plurality of antennas. In such a case, at least one antenna appropriate for a communication scheme used in the communication network, such as the first network 1298 or the second network 1299, may be selected, for example, by the communication module 1290 from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 1204 via the server 1208 coupled with the second network 1299. Each of the electronic devices 1202 and 1204 may be a device of a same type as, or a different type, from the electronic device 101. According to an embodiment, all or some of operations to be executed at the electronic device 101 may be executed at one or more of the external electronic devices 1202, 1204, or 1208. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 1240) including one or more instructions that are stored in a storage medium (e.g., internal memory 1236 or external memory 1238) that is readable by a machine (e.g., the electronic device 101). For example, a processor (e.g., the processor 1220) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device 500 may include: a communication interface 110; a processor 160; and a memory 150, wherein the memory 150 may store instructions configured to cause, when executed, the processor 160 to acquire a user utterance, identify context information related to the user utterance, select, as a target device, at least one external electronic device from among a plurality of external electronic devices on the basis of the context information, and transmit at least some of the context information to the at least one external electronic device selected as the target device through the communication interface.

According to various embodiments, the instructions may be configured to cause the processor to further perform a task corresponding to the user utterance.

According to various embodiments, the context information may include information on a result of performing a task corresponding to the user utterance or domain status information corresponding to the user utterance.

According to various embodiments, the instructions may be configured to cause the processor to select the at least one external electronic device supporting a second domain corresponding to a first domain for the user utterance.

According to various embodiments, the instructions may be configured to cause the processor to select the at least one external electronic device which is capable of supporting the second domain corresponding to the first domain for the user utterance, and performing a second intent corresponding to a first intent for the user utterance.

According to various embodiments, the instructions may be configured to cause the processor to select the at least one external electronic device supporting an attribute of the second domain corresponding to an attribute of the first domain for the user utterance.

According to various embodiments, the instructions may be configured to cause the processor to select the at least one external electronic device corresponding to the context information using a pre-stored device mapping table.

According to various embodiments, the instructions may be configured to cause the processor to transmit at least some of the context information to the at least one external electronic device according to a predetermined period or, based on identifying a change in the context information, transmit at least some of the context information to the at least one external electronic device, through the communication interface.

According to various embodiments, each of the plurality of external electronic devices may be a device for acquiring a user utterance and performing a task corresponding to the user utterance, and may establish a short-range wireless communication connection with the electronic device.

According to various embodiments, an electronic device 1000 may include: a communication interface 110; a processor 160; and a memory 150, wherein the memory 150 may store instructions configured to cause, when executed, the processor 160 to acquire a user utterance, establish a short-range wireless communication connection with an external electronic device for performing a task corresponding to the user utterance through the communication interface, acquire first context information from the external electronic device through the communication interface, identify whether or not it is necessary to update second context information regarding the state of the electronic device on the basis of the first context information, and, based on identifying that it is necessary to update the second context information, update the second context information using the first context information.

According to various embodiments, the instructions may be configured to cause the processor, based on identifying that it is not necessary to update the second context information, to update context history information stored in the electronic device using the first context information, and based on identifying that it is necessary to update the second context information, to update the second context information and the context history information using the first context information.

According to various embodiments, a method of processing a user utterance may include: acquiring a user utterance; identifying context information related to the user utterance; selecting, as a target device, at least one external electronic device from among a plurality of external electronic devices on the basis of the context information; and transmitting at least some of the context information to the at least one external electronic device selected as the target device through a communication interface.

According to various embodiments, the method of processing a user utterance may further include performing a task corresponding to the user utterance.

According to various embodiments, the selecting, as the target device, the at least one external electronic device may include selecting the at least one external electronic device supporting a second domain corresponding to a first domain for the user utterance.

According to various embodiments, the selecting, as the target device, the at least one external electronic device may include selecting the at least one external electronic device which is capable of supporting the second domain corresponding to the first domain for the user utterance, and performing a second intent corresponding to a first intent for the user utterance.

According to various embodiments, the selecting, as the target device, the at least one external electronic device may include selecting the at least one external electronic device supporting an attribute of the second domain corresponding to an attribute of the first domain for the user utterance.

According to various embodiments, the selecting, as the target device, the at least one external electronic device may include selecting the at least one external electronic device corresponding to the context information using a pre-stored device mapping table.

According to various embodiments, the method of processing a user utterance may further include transmitting at least some of the context information to the at least one external electronic device according to a predetermined period or, based on identifying a change in the context information, transmitting at least some of the context information to the at least one external electronic device, through the communication interface.

What is claimed is:

1. An electronic device comprising:
communication circuitry;
a processor; and
memory,
wherein the memory stores instructions cause, when executed by the processor, the electronic device to:
   acquire first context information from a first external electronic device of a plurality of external electronic devices through the communication circuitry, based on the first context information, update context history information which is stored in the electronic device and associated with a plurality of user utterances, acquire a user utterance, identify context information related to the user utterance, the context information including the updated context history information which is associated with the plurality of user utterances different from the user utterance, select, as a target device, at least one external electronic device from among the plurality of external electronic devices based on the context information including the updated context history information, and transmit at least some of the context information to the at least one external electronic device selected as the target device through the communication circuitry.

2. The electronic device of claim 1, wherein the instructions cause the electronic device to further perform a task corresponding to the user utterance.

3. The electronic device of claim 1, wherein the context information comprises information on a result of performing a task corresponding to the user utterance or domain status information corresponding to the user utterance.

4. The electronic device of claim 1, wherein the instructions cause the electronic device to select the at least one external electronic device supporting a second domain corresponding to a first domain for the user utterance.

5. The electronic device of claim 4, wherein the instructions cause the electronic device to select the at least one external electronic device supporting the second domain corresponding to the first domain for the user utterance, and being capable of performing a second intent corresponding to a first intent for the user utterance.

6. The electronic device of claim 4, wherein the instructions cause the electronic device to select the at least one external electronic device supporting an attribute of the second domain corresponding to an attribute of the first domain for the user utterance.

7. The electronic device of claim 1, wherein the instructions cause the electronic device to select the at least one external electronic device corresponding to the context information using a pre-stored device mapping table.

8. The electronic device of claim 1, wherein the instructions cause the electronic device to transmit at least some of the context information to the at least one external electronic device according to a predetermined period or, based on identifying a change in the context information, transmit at least some of the context information to the at least one external electronic device, through the communication circuitry.

9. The electronic device of claim 1, wherein each of the plurality of external electronic devices is a device for acquiring a user utterance and performing a task corresponding to the user utterance, and establishes a short-range wireless communication connection with the electronic device.

10. A method of processing a user utterance by an electronic device, the method comprising:

acquiring first context information from a first external electronic device of a plurality of external electronic devices through a communication circuitry;

based on the first context information, updating context history information which is stored in the electronic device and associated with a plurality of user utterances;

acquiring the user utterance;

identifying context information related to the user utterance, the context information including the updated context history information which is associated with the plurality of user utterances different from the user utterance;

selecting, as a target device, at least one external electronic device from among the plurality of external electronic devices based on the context information including the updated context history information; and transmitting at least some of the context information to the at least one external electronic device selected as the target device through a communication circuitry.

11. The method of claim 10, further comprising performing a task corresponding to the user utterance.

12. The method of claim 10, wherein the context information comprises information on a result of performing a task corresponding to the user utterance or domain status information corresponding to the user utterance.

13. The method of claim 10, wherein the selecting, as the target device, the at least one external electronic device comprising selecting the at least one external electronic device supporting a second domain corresponding to a first domain for the user utterance.

14. The method of claim 13, wherein the selecting, as the target device, the at least one external electronic device comprising selecting the at least one external electronic device supporting the second domain corresponding to the first domain for the user utterance and being capable of performing a second intent corresponding to a first intent for the user utterance.

15. The method of claim 13, wherein the selecting, as the target device, the at least one external electronic device comprising selecting the at least one external electronic device supporting an attribute of the second domain corresponding to an attribute of the first domain for the user utterance.

16. The method of claim 10, wherein the selecting, as the target device, the at least one external electronic device comprising selecting the at least one external electronic device corresponding to the context information using a pre-stored device mapping table.

17. The method of claim 10, further comprising, transmitting at least some of the context information to the at least one external electronic device according to a predetermined period or, based on identifying a change in the context information, transmitting at least some of the context information to the at least one external electronic device, through the communication circuitry.

18. The method of claim 10, wherein each of the plurality of external electronic devices is a device for acquiring a user utterance and performing a task corresponding to the user utterance, and establishes a short-range wireless communication connection with the electronic device.

* * * * *